(12) United States Patent
Kubo et al.

(10) Patent No.: US 9,374,494 B2
(45) Date of Patent: *Jun. 21, 2016

(54) RECORDING APPARATUS AND METHOD, REPRODUCING APPARATUS AND METHOD, AND PROGRAM

(71) Applicant: SONY CORPORATION, Tokyo (JP)

(72) Inventors: Tsuyoshi Kubo, Tokyo (JP); Kumiko Shimazaki, Tokyo (JP); Hiroyuki Tominaga, Tokyo (JP); Sachiyo Noguchi, Tokyo (JP); Masayuki Kuwata, Tokyo (JP); Nahoko Kaji, Tokyo (JP); Takashi Nunomaki, Tokyo (JP); Ko Kobayashi, Tokyo (JP); Noriko Ohtsuka, Tokyo (JP); Mihoko Yamamoto, Tokyo (JP); Simon Currie, Tokyo (JP); Keisuke Okawa, Tokyo (JP); Takashi Oguma, Tokyo (JP); Kenichiro Imai, Tokyo (JP); Katsuhiko Watanabe, Tokyo (JP); Tetsuo Morimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/942,826

(22) Filed: Jul. 16, 2013

(65) Prior Publication Data

US 2013/0300888 A1    Nov. 14, 2013

Related U.S. Application Data

(63) Continuation of application No. 11/661,967, filed as application No. PCT/JP2005/016516 on Sep. 8, 2005, now Pat. No. 8,520,086.

(51) Int. Cl.

| H04N 5/225 | (2006.01) |
|---|---|
| H04N 5/76 | (2006.01) |
| H04N 1/21 | (2006.01) |
| H04N 5/343 | (2011.01) |
| H04N 5/262 | (2006.01) |
| H04N 5/232 | (2006.01) |

(52) U.S. Cl.
CPC ............ *H04N 1/212* (2013.01); *H04N 1/2125* (2013.01); *H04N 5/23245* (2013.01); *H04N 5/23293* (2013.01); *H04N 5/2621* (2013.01); *H04N 5/343* (2013.01)

(58) Field of Classification Search
CPC ... H04N 1/2112; H04N 1/212; H04N 1/2125; H04N 5/23245; H04N 5/2621; H04N 5/343; H04N 5/23293
USPC ......... 348/220.1, 221.1, 231.99, 231.2–231.4
See application file for complete search history.

(56) References Cited

U.S. PATENT DOCUMENTS

| 7,110,027 B2* | 9/2006 | Wyman ..................... 348/231.9 |
| 7,411,623 B2* | 8/2008 | Shibutani ................ 348/333.02 |
| 8,520,086 B2* | 8/2013 | Kubo et al. ................ 348/220.1 |
| 2004/0109067 A1* | 6/2004 | Yokoi ........................ 348/220.1 |

FOREIGN PATENT DOCUMENTS

JP    2001111934 A  *  4/2001 ............. H04N 5/765

OTHER PUBLICATIONS

English Translation JP 2001-111934 published Apr. 20, 2001.*

* cited by examiner

*Primary Examiner* — Daniel M Pasiewicz
(74) *Attorney, Agent, or Firm* — Finnegan Henderson Farabow Garrett & Dunner LLP

(57) ABSTRACT

The present invention relates to a recording apparatus and method, a reproducing apparatus and method, and a program that make it possible to photograph and record a still image and moving images before and after the still image as well. In step S1, when a still-image-with-moving-image photographing mode is set, moving image temporary storage is started. When a shutter is depressed in step S2, in step S3, a photographed still image is recorded and one moving image is generated from the moving image before the still image stored in step S1, a moving image obtained by converting the photographed still image, and a moving image photographed after the depression of the shutter and the one moving image generated is recorded. Therefore, the moving images before and after the still image are recorded together with a high-definition still image.

29 Claims, 22 Drawing Sheets

| FILE NUMBER | FILE TYPE |
|---|---|
| 1 | JPEG |
| 2 | Hybrid REC |

| FILE NUMBER | FILE TYPE |
|---|---|
| 1 | JPEG |
| 2 | Hybrid REC |
| 3 | Hybrid REC |

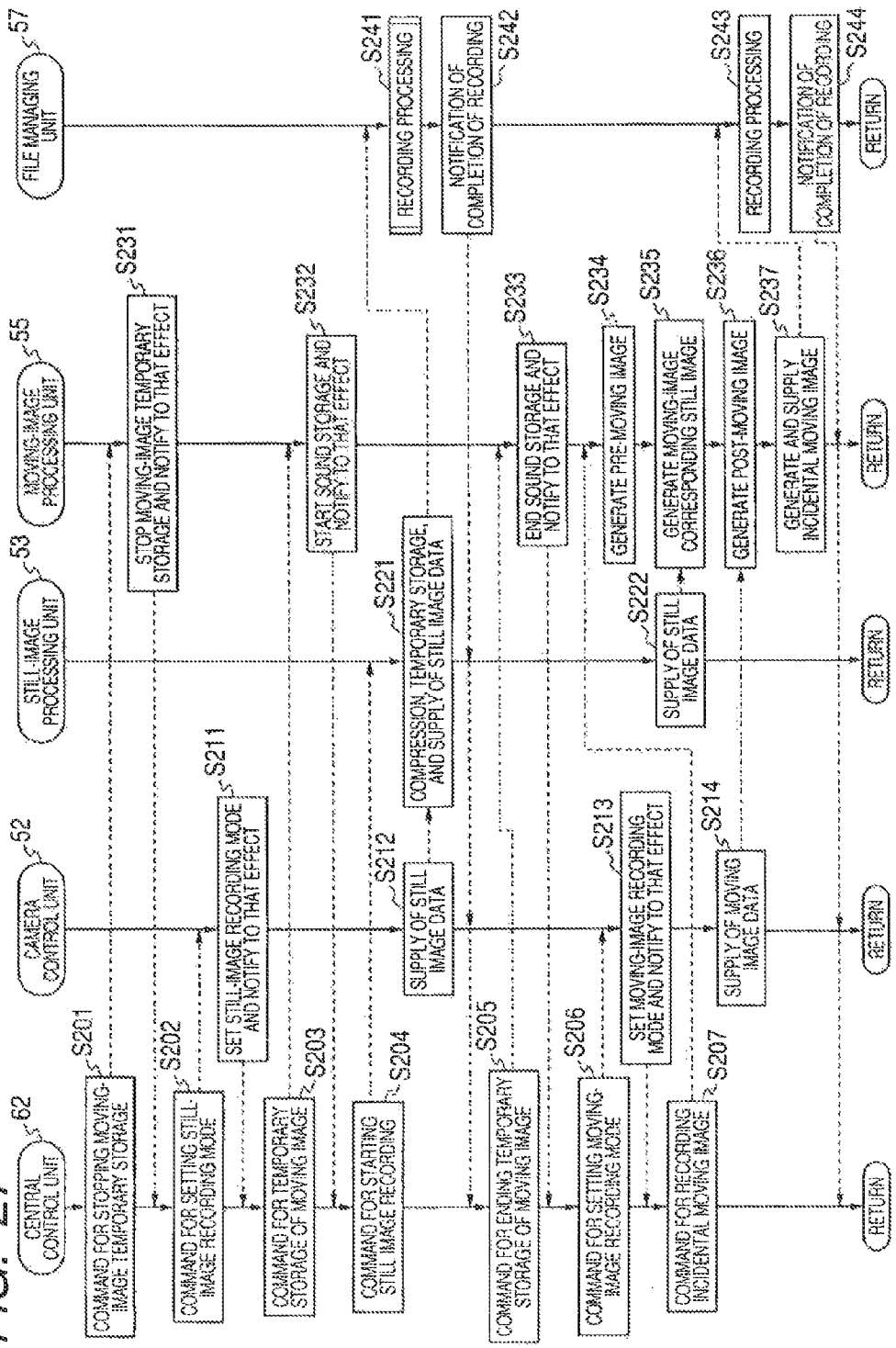

RECORDING APPARATUS AND METHOD, REPRODUCING APPARATUS AND METHOD, AND PROGRAM

This application is a continuation of U.S. Patent Application No. 11/661,967, filed
Mar. 26, 2009, which claims the benefit of PCT/JP2005/016516, filed Sep. 8, 2005 and Japanese Application No. 2004-261443, filed Sep. 8, 2004, the entire disclosures of which are incorporated herein by reference.

TECHNICAL FIELD

The present invention relates to a recording apparatus and method, a reproducing apparatus and method, and a program, and, more particularly to a recording apparatus and method, a reproducing apparatus and method, and a program suitable for photographing a still image, and moving images before and after the still image as well, or reproducing an image obtained as a result of the photographing.

BACKGROUND ART

Digital cameras are widespread as photographing apparatuses that can hold photographed images as digital data and can be easily used. In recent years, according to the advent of the high-performance CPU, it is possible to photograph not only still images but also a moving image using the digital cameras.

A digital camera that can photograph a still image and moving images before and after the still image by using such a digital camera that can photograph moving images as well has been devised (see Patent Document 1).

[Patent Document 1] JP-A-2003-92724

DISCLOSURE OF THE INVENTION

Problems to be Solved by the Invention

However, in photographing a still image and moving images before and after the still image, in the past, actually, only photographing of the moving images is performed. An image as a still image is generated from one piece of image data photographed as a moving image. In other words, in the past, in photographing a still image and moving images before and after the still image, a high-definition image peculiar to the still image cannot be reproduced.

The invention has been devised in view of such circumstances and makes it possible to photograph a still image and moving images before and after the still image such that a high-definition still image can be reproduced.

Means for Solving the Problems

A first recording apparatus according to the invention is characterized by including: setting means for performing setting of a still-image-with-moving-image photographing mode; still-image photographing means for performing photographing of a still image when a still-image photographing request is received while the still-image-with-moving-image photographing mode is set; moving-image photographing means for performing photographing of a moving image while the still-image-with-moving-image photographing mode is set; generating means for generating one incidental moving image on the basis of a still image obtained as a result of the photographing by the still-image photographing means and a moving image obtained as a result of the photographing by the moving-image photographing means; and recording means for recording the still image obtained as a result of the photographing by the still-image photographing means and the incidental moving image generated by the generating means.

The generating means can generate the incidental moving image on the basis of a first moving image obtained by converting the still image obtained as a result of the photographing by the still-image photographing means into a moving image, a second moving image photographed by the moving-image photographing means before the photographing of the still image by the still-image photographing means; and a third moving image photographed by the moving-image photographing means after the photographing of the still image by the still-image photographing means.

The generating means can generate the incidental moving image on the basis of a first moving image obtained by converting the still image obtained as a result of the photographing by the still-image photographing means into a moving image and a second moving image photographed by the moving-image photographing means before the photographing of the still image by the still-image photographing means.

The generating means can generate the incidental moving image on the basis of a first moving image obtained by converting the still image obtained as a result of the photographing by the still-image photographing means into a moving image and a third moving image photographed by the moving-image photographing means after the photographing of the still image by the still-image photographing means.

The moving-image photographing means can start photographing of a moving image when the still-image-with-moving-image photographing mode is set.

The moving-image photographing means can start photographing of a moving image when a power supply of the recording apparatus is turned on.

The moving-image photographing means can start photographing of a moving image when a recording medium is inserted.

The generating means can add an effect to the first moving image obtained by converting the still image obtained as a result of the photographing by the still-image photographing means.

The generating means can provide a dummy frame before or after or before and after a frame of the first moving image obtained by converting the still image obtained as a result of the photographing by the still-image photographing means.

The generating means can insert shutter sound, which is outputted according to timing when the first moving image obtained by converting the still image obtained as a result of the photographing by the still-image photographing means is reproduced, into the first moving image.

$

It is possible to further provide first sound acquiring means for acquiring sound data of sound during the photographing of a moving image by the moving image photographing means and second sound means for acquiring sound data of sound during the photographing of a still image by the still-image photographing means. The generating means can generate the incidental moving image by multiplexing sound acquired by the first sound acquiring means, which corresponds to the moving image used for generating the incidental moving image, and all or a part of the sound data acquired by the second sound acquiring means, which corresponds to the still image used for generating the incidental moving image.

The generating means can provide, when a frame rate of a moving image on a reproduction side is fixed, dummy frames in a number enough for maintaining the frame rate before or after or before and after a frame of the first moving image obtained by converting the still image obtained as a result of the photographing by the still-image photographing means.

The generating means can provide, when a frame rate of a moving image on a reproduction side is variable, an arbitrary number of dummy frames before or after or before and after a frame of the first moving image obtained by converting the still image obtained as a result of the photographing by the still-image photographing means.

The generating means can extract a predetermined moving image out of a moving image photographed by the moving-image photographing means and generate the incidental moving image from the moving image extracted and a moving image obtained by converting the still image obtained as a result of the photographing by the still-image photographing means.

The generating means can extract, when the moving image photographed by the moving-image photographing means is formed by using inter-frame compression, a moving image headed by a frame for which only intra-frame compression is used or a frame forming a basis of the inter-frame compression.

The recording means can record the still image obtained as a result of the photographing by the still-image photographing means and the incidental moving image generated by the generating means under the same file name.

It is possible to further provide display control means for displaying a UI image corresponding to a recorded image during the recording by the recording means A first recording method according to the invention is characterized by including: a setting step of performing setting of a still-image-with-moving-image photographing mode; a still-image photographing step of performing photographing of a still image when a still-image photographing request is received while the still-image-with-moving-image photographing mode is set; a moving-image photographing step of performing photographing of a moving image while the still-image-with-moving-image photographing mode is set; a generating step of generating one incidental moving image on the basis of a still image obtained as a result of the photographing in processing in the still-image photographing step and a moving image obtained as a result of the photographing in processing in the moving-image photographing step; and a recording step of recording the still image obtained as a result of the photographing in the processing in the still-image photographing step and the incidental moving image generated in the processing in the generating step.

A first program according to the invention is characterized by including: a setting step of performing setting of a still-image-with-moving-image photographing mode; a still-image photographing step of performing photographing of a still image when a still-image photographing request is received while the still-image-with-moving-image photographing mode is set; a moving-image photographing step of performing photographing of a moving image while the still-image-with-moving-image photographing mode is set; a generating step of generating one incidental moving image on the basis of a still image obtained as a result of the photographing in processing in the still-image photographing step and a moving image obtained as a result of the photographing in processing in the moving-image photographing step; and a recording step of recording the still image obtained as a result of the photographing in the processing in the still-image photographing step and the incidental moving image generated in the processing in the generating step.

In the first recording apparatus, method, and program according to the invention, the still-image-with-moving-image photographing mode is set, a still image is photographed when a still-image photographing request is received while the still-image-with-moving-image photographing mode is set, a moving image is photographed while the still-image-with-moving-image photographing mode is set, one incidental moving image is generated on the basis of the still image and the moving image photographed, and the still image photographed and the incidental moving image generated are recorded.

A second recording apparatus according to the invention is characterized by including: setting means for performing setting of a still-image-with-moving-image photographing mode; still-image photographing means for performing photographing of a still image when a still-image photographing request is received while the still-image-with-moving-image photographing mode is set; moving-image photographing means for performing photographing of a moving image while the still-image-with-moving-image photographing mode is set; and recording means for recording a still image obtained as a result of the photographing by the still-image photographing means, a moving image photographed by the moving-image photographing means before the photographing of the still image by the still-image photographing means, and a moving image photographed by the moving-image photographing means after the photographing of the still image by the still-image photographing means as different files.

A second recording method according to the invention is characterized by including: a setting step of performing setting of a still-image-with-moving-image photographing mode; a still-image photographing step of performing photographing of a still image when a still-image photographing request is received while the still-image-with-moving-image photographing mode is set; a moving-image photographing step of performing photographing of a moving image while the still-image-with-moving-image photographing mode is set; and a recording step of recording a still image obtained as a result of the photographing in processing in the still-image photographing step, a moving image photographed in the processing in the moving-image photographing step before, the photographing of the still image in the processing in the still-image photographing step, and a moving image photographed in the processing in the moving-image photographing step after the photographing of the still image in the processing in the still-image photographing step as different files.

A second recording program according to the invention is characterized by including: a setting step of performing setting of a still-image-with-moving-image photographing mode; a still-image photographing step of performing photographing of a still image when a still-image photographing request is received while the still-image-with-moving-image photographing mode is set; a moving-image photographing step of performing photographing of a moving image while the still-image-with-moving-image photographing mode is set; and a recording step of recording a still image obtained as a result of the photographing in processing in the still-image photographing step, a moving image photographed in the processing in the moving-image photographing step before the photographing of the still image in the processing in the still-image photographing step, and a moving image photographed in the processing in the moving-image photographing step after the photographing of the still image in the processing in the still-image photographing step as different files.

In the second recording apparatus, method, and program according to the invention, the still-image-with-moving-image photographing mode is set, a still image is photographed when a still-image photographing request is received while the still-image-with-moving-image photographing mode is set, a moving image is photographed while the still-image-with-moving-image photographing mode is set, and the still image photographed, the moving image photographed before the photographing of the still image, and the moving image photographed after the photographing of the still image are recorded as different files.

A first reproducing apparatus according to the invention that reproduces an image recorded by a recording apparatus characterized by including setting means for performing setting of a still-image-with-moving-image photographing mode, still-image photographing means for performing photographing of a still image when a still-image photographing request is received while the still-image-with-moving-image photographing mode is set, moving-image photographing means for performing photographing of a moving image while the still-image-with-moving-image photographing mode is set, generating means for generating one incidental moving image on the basis of a still image obtained as a result of the photographing by the still-image photographing means and a moving image obtained as a result of the photographing by the moving-image photographing means, and recording means for recording the still image obtained as a result of the photographing by the still-image photographing means and the incidental moving image generated by the generating means is characterized by including: first reproducing means for reproducing, when reproduction of a still image photographed in the still-image-with-moving-image photographing mode is requested, the still image obtained as a result of the photographing by the still-image photographing means, which is recorded in the recording means of the recording apparatus; and second reproducing means for reproducing, when reproduction of a moving image photographed in the still-image-with-moving-image photographing mode is requested, the incidental moving image generated by the generating means, which is recorded in the recording means of the recording apparatus.

The second reproducing means can reproduce, when the still image obtained as a result of the photographing by the still-image photographing means and the incidental moving image generated by the generating means are recorded under the same file name by the recording means of the recording apparatus, a moving image having a file name same as that of a still image reproduced by the first reproducing means.

It is possible to further provide display control means for displaying a thumbnail image of an image recorded in the still-image-with-moving-image photographing setting mode and cause the display control means to add an indication that the image is photographed in the photographing-with-moving-image setting mode to the thumbnail image.

A first reproducing method according to the invention of reproducing an image recorded by a recording apparatus characterized by including setting means for performing setting of a still-image-with-moving-image photographing mode, still-image photographing means for performing photographing of a still image when a still-image photographing request is received while the still-image-with-moving-image photographing mode is set, moving-image photographing means for performing photographing of a moving image while the still-image-with-moving-image photographing mode is set, generating means for generating one incidental moving image on the basis of a still image obtained as a result of the photographing by the still-image photographing means and a moving image obtained as a result of the photographing by the moving-image photographing means, and recording means for recording the still image obtained as a result of the photographing by the still-image photographing means and the incidental moving image generated by the generating means is characterized by including: a first reproducing step of reproducing, when reproduction of a still image photographed in the still-image-with-moving-image photographing mode is requested, the still image obtained as a result of the photographing by the still-image photographing means, which is recorded in the recording means of the recording apparatus; and a second reproducing step of reproducing, when reproduction of a moving image photographed in the still-image-with-moving-image photographing mode is requested, the incidental moving image generated by the generating means, which is recorded in the recording means of the recording apparatus.

A first program according to the invention executed by a processor that controls a reproducing apparatus that reproduces an image recorded by a recording apparatus characterized by including setting means for performing setting of a still-image-with-moving-image photographing mode, still-image photographing means for performing photographing of a still image when a still-image photographing request is received while the still-image-with-moving-image photographing mode is set, moving-image photographing means for performing photographing of a moving image while the still-image-with-moving-image photographing mode is set, generating means for generating one incidental moving image on the basis of a still image obtained as a result of the photographing by the still-image photographing means and a moving image obtained as a result of the photographing by the moving-image photographing means, and recording means for recording the still image obtained as a result of the photographing by the still-image photographing means and the incidental moving image generated by the generating means is characterized by including: a first reproducing step of reproducing, when reproduction of a still image photographed in the still-image-with-moving-image photographing mode is requested, the still image obtained as a result of the photographing by the still-image photographing means, which is recorded in the recording means of the recording apparatus; and a second reproducing step of reproducing, when reproduction of a moving image photographed in the still-image-with-moving-image photographing mode is requested, the incidental moving image generated by the generating means, which is recorded in the recording means of the recording apparatus.

In the first reproducing apparatus, method, and program according to the invention for reproducing an image recorded by a recording apparatus characterized by including setting means for performing setting of a still-image-with-moving-image photographing mode, still-image photographing means for performing photographing of a still image when a still-image photographing request is received while the still-image-with-moving-image photographing mode is set, moving-image photographing means for performing photographing of a moving image while the still-image-with-moving-image photographing mode is set, generating means for generating one incidental moving image on the basis of a still image obtained as a result of the photographing by the still-image photographing means and a moving image obtained as a result of the photographing by the moving-image photographing means, and recording means for recording the still image obtained as a result of the photographing by the still-image photographing means and the incidental moving image generated by the generating means, when reproduction of a still image photographed in the still-image-with-moving-image photographing mode is requested, the still image obtained as a result of the photographing by the still-image photographing means, which is recorded in the recording means of the recording apparatus, is reproduced and, when reproduction of a moving image photographed in the still-image-with-moving image photographing mode is requested, the incidental moving image generated by the generating means, which is recorded in the recording means of the recording apparatus, is reproduced.

A second reproducing apparatus according to the invention that reproduces an image recorded by a recording apparatus characterized by including setting means for performing setting of a still-image-with-moving-image photographing mode, still-image photographing means for performing photographing of a still image when a still-image photographing request is received while the still-image-with-moving-image photographing mode is set, moving-image photographing means for performing photographing of a moving image while the still-image-with-moving-image photographing mode is set, and recording means for recording a still image obtained as a result of the photographing by the still-image photographing means, a moving image photographed by the moving-image photographing means before the photographing of the still image by the still-image photographing means, and a moving image photographed by the moving-image photographing means after the photographing of the still image by the still-image photographing means as different files is characterized by including: first reproducing means for reproducing, when reproduction of a still image photographed in the still-image-with-moving-image photographing mode is requested, the still image obtained as a result of the photographing by the still-image photographing means, which is recorded in the recording means of the recording apparatus; and second reproducing means for generating, when reproduction of a moving image photographed in the still-image-with-moving-image photographing mode is requested, one incidental moving image on the basis of the still image obtained as a result of the photographing by the still-image photographing means and the moving image obtained as a result of the photographing by the moving-image photographing means and reproducing the incidental moving image.

A second reproducing method according to the invention of reproducing an image recorded by a recording apparatus characterized by including setting means for performing setting of a still-image-with-moving-image photographing mode, still-image photographing means for performing photographing of a still image when a still-image photographing request is received while the still-image-with-moving-image photographing mode is set, moving-image photographing means for performing photographing of a moving image while the still-image-with-moving-image photographing mode is set, and recording means for recording a still image obtained as a result of the photographing by the still-image photographing means, a moving image photographed by the moving-image photographing means before the photographing of the still image by the still-image photographing means, and a moving image photographed by the moving-image photographing means after the photographing of the still image by the still-image photographing means as different files is characterized by including: a first reproducing step of reproducing, when reproduction of a still image photographed in the still-image-with-moving-image photographing mode is requested, the still image obtained as a result of the photographing by the still-image photographing means, which is recorded in the recording means of the recording apparatus; and a second reproducing step of generating, when reproduction of a moving image photographed in the still-image-with-moving-image photographing mode is requested, one incidental moving image on the basis of the still image obtained as a result of the photographing by the still-image photographing means and the moving image obtained as a result of the photographing by the moving-image photographing means and reproducing the incidental moving image.

A program according to the invention executed by a processor that controls a reproducing apparatus that reproduces an image recorded by a recording apparatus characterized by including setting means for performing setting of a still-image-with-moving-image photographing mode, still-image photographing means for performing photographing of a still image when a still-image photographing request is received while the still-image-with-moving-image photographing mode is set, moving-image photographing means for performing photographing of a moving image while the still-image-with-moving-image photographing mode is set, and recording means for recording a still image obtained as a result of the photographing by the still-image photographing means, a moving image photographed by the moving-image photographing means before the photographing of the still image by the still-image photographing means, and a moving image photographed by the moving-image photographing means after the photographing of the still image by the still-image photographing means as different files is characterized by including: a first reproducing step of reproducing, when reproduction of a still image photographed in the still-image-with-moving-image photographing mode is requested, the still image obtained as a result of the photographing by the still-image photographing means, which is recorded in the recording means of the recording apparatus; and a second reproducing step of generating, when reproduction of a moving image photographed in the still-image-with-moving-image photographing mode is requested, one incidental moving image on the basis of the still image obtained as a result of the photographing by the still-image photographing means and the moving image obtained as a result of the photographing by the moving-image photographing means and reproducing the incidental moving image.

In the second reproducing apparatus, method, and program according to the invention for reproducing an image recorded by a recording apparatus characterized by including setting means for performing setting of a still-image-with-moving-image photographing mode, still-image photographing means for performing photographing of a still image when a still-image photographing request is received while the still-image-with-moving-image photographing mode is set, moving-image photographing means for performing photographing of a moving image while the still-image-with-moving-image photographing mode is set, and recording means for recording a still image obtained as a result of the photographing by the still-image photographing means, a moving image photographed by the moving-image photographing means before the photographing of the still image by the still-image photographing means, and a moving image photographed by the moving-image photographing means after the photographing of the still image by the still-image photographing means as different files, when reproduction of a still image photographed in the still-image-with-moving-image photographing mode is requested, the still image obtained as a result of the photographing by the still-image photographing means, which is recorded in the recording means of the recording apparatus is reproduced and, when reproduction of a moving image photographed in the still-image-with-moving-image photographing mode is requested, one incidental moving image is generated on the basis of the still image obtained as a result of the photographing by the still-image photographing means and the moving image obtained as a result of the photographing by the moving-image photographing means and the incidental moving image is reproduced.

Advantages of the Invention

According to the first invention, it is possible to photograph and record a still image and a moving image at least before or after the still image such that a high-definition still image can be reproduced.

According to the second invention, it is possible to reproduce a still image and moving images before and after the still image

BRIEF DESCRIPTION OF THE DRAWINGS

FIG. 27 is another flowchart for explaining details of the recording processing in step S3 in FIG. 3.

DESCRIPTION OF REFERENCE NUMERALS AND SIGNS

Figure 1:
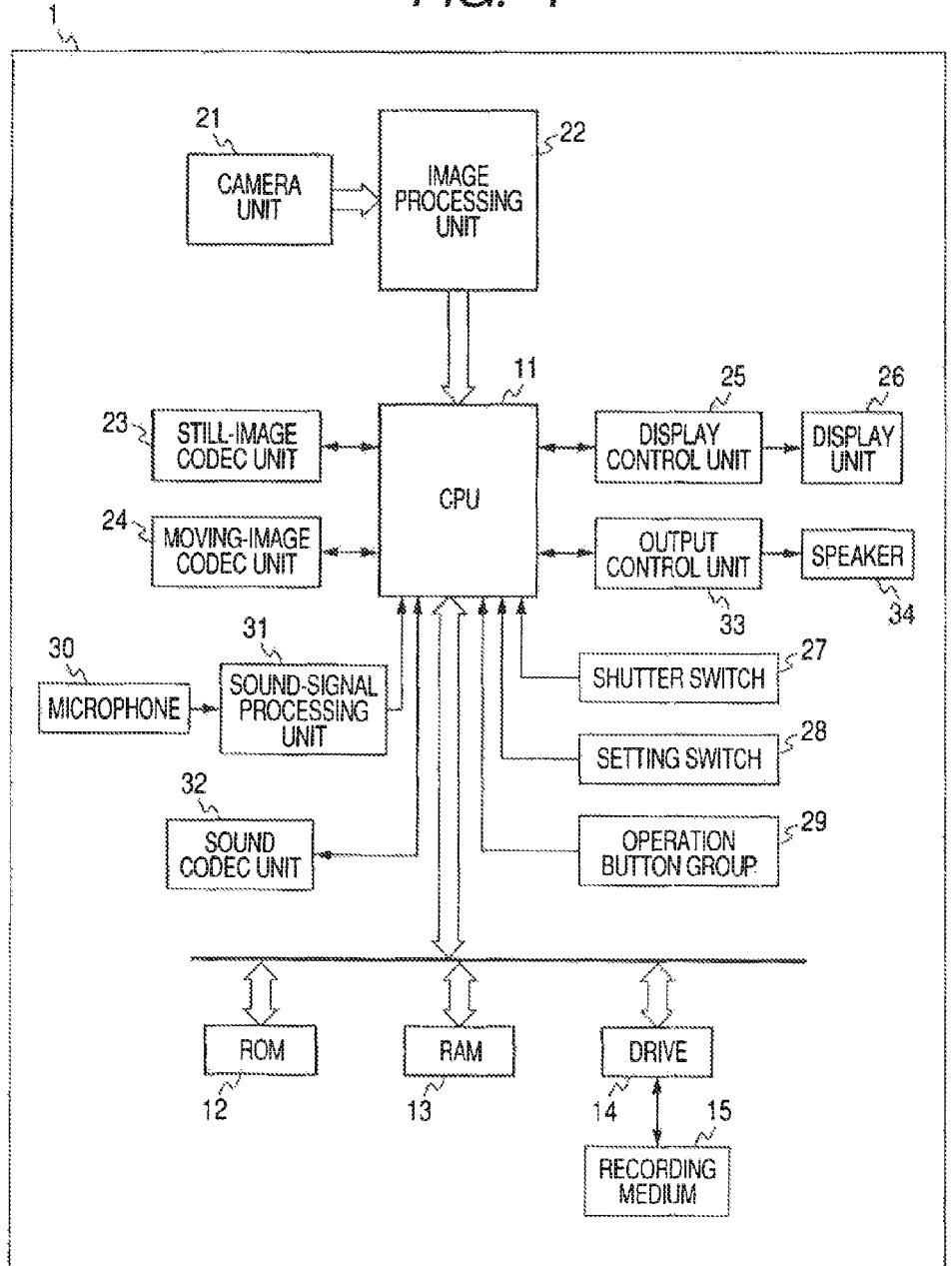
FIG. 1 is a block diagram showing an example of a structure of a digital camera for which the invention is provided.

1 Digital Camera
11 CPU
12 ROM
13 RAM
14 Drive
15 Recording medium
21 Camera unit
22 Image processing unit
23 Still-image codec unit
24 Moving-image codec unit
25 Display control unit
26 Display unit
30 Microphone
31 Sound-signal processing unit
32 Sound codec unit
51 Image-data inputting unit
52 Camera control unit
53 Still-image processing unit
54 Still-image storing unit
55 Moving-image processing unit
56 Moving-image storing unit
57 File managing unit
71 Sound inputting unit

BEST MODE FOR CARRYING OUT THE INVENTION

Embodiments of the invention will be hereinafter explained. A correspondence relation between the invention described in this specification and the embodiments of the invention is illustrated as follows. This description is to confirm that embodiments supporting the invention described in this specification are described in this specification. Therefore, even if there is an embodiment described in the embodiments of the invention but not described herein as corresponding to the invention, this does not means that the embodiment does not correspond to the invention. Conversely, even if an embodiment is described herein as corresponding to the invention, this does not mean that the embodiment does not correspond to inventions other than the invention.

Moreover, this description does not mean all the inventions described in this specification. In other words, this description does not deny presence of an Invention described in this specification but not claimed in this application, that is, an invention that will be divisionally applied for patent or will appear or be added because of amendment in future.

Figure 2:
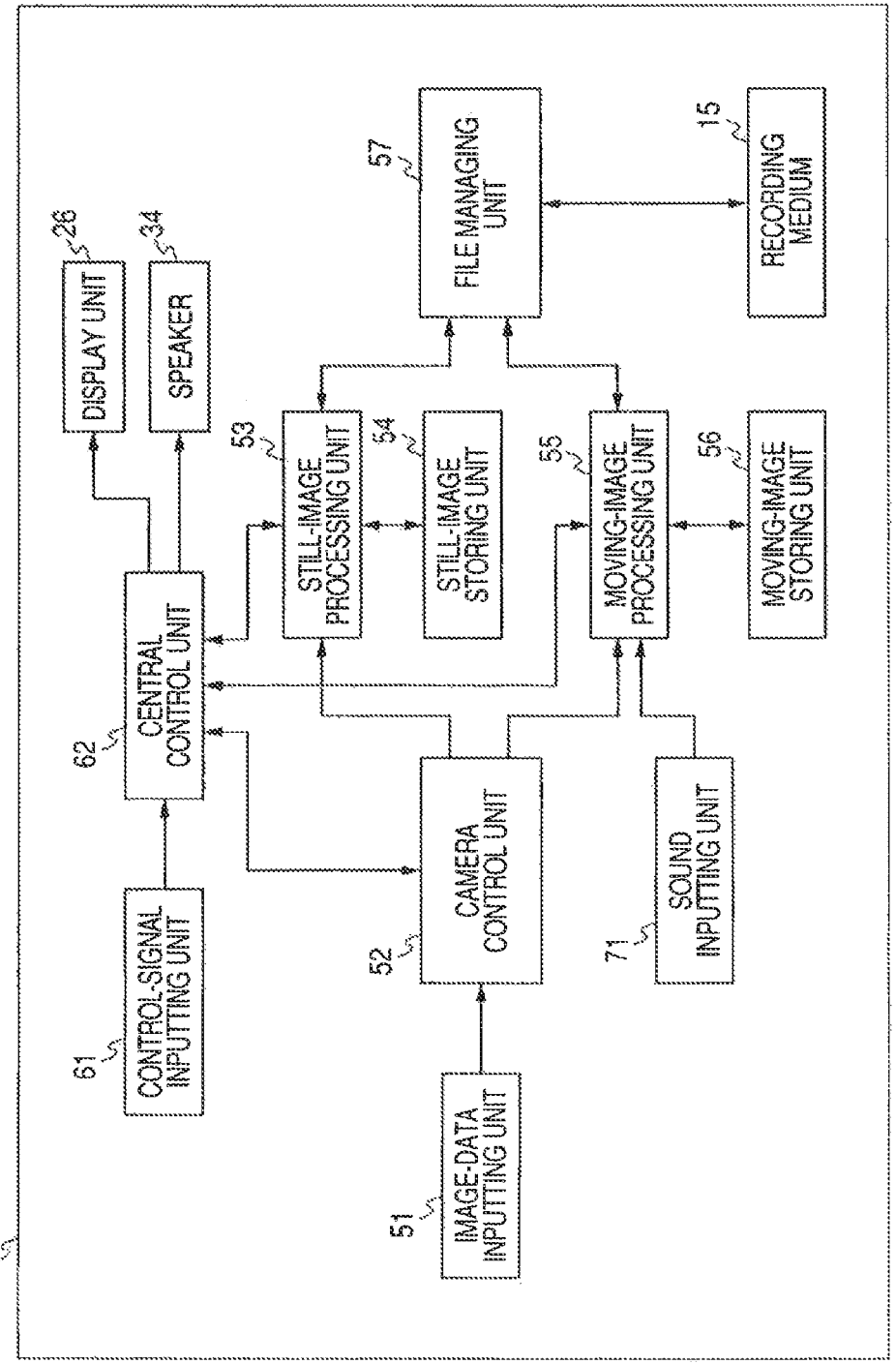
FIG. 2 is a block diagram showing an example of a functional structure of the digital camera in FIG. 1.

A first recording apparatus according to the invention is characterized by including: setting means (e.g., a setting switch 28 in FIG. 1) for performing setting of a still-image-with-moving-image photographing mode; still-image photographing means (e.g., a central control unit 62, a camera control unit 52, and a still-image processing unit 53 in FIG. 2) for performing photographing of a still image when a still-image photographing request is received while the still-image-with-moving-image photographing mode is set; moving-image photographing means (e.g., the central control unit 62, the camera control unit 52, and the moving-image processing unit 55 in FIG. 2) for performing photographing of a moving image while the still-image-with-moving-image photographing mode is set; generating means (e.g., the moving-image processing unit 55 in FIG. 2) for generating one incidental moving image on the basis of a still image obtained as a result of the photographing by the still-image photographing means and a moving image obtained as a result of the photographing by the moving-image photographing means; and recording means (e.g., a file managing unit 57 and a recording medium 15 in FIG. 2) for recording the still image obtained as a result of the photographing by the still-image photographing means and the incidental moving image generated by the generating means.

The generating means can generate the incidental moving image on the basis of a first moving image (e.g., a still-image corresponding moving image Mc in FIG. 9) obtained by converting the still image obtained as a result of the photographing by the still-image photographing means into a moving image, a second moving image (e.g., a pre-moving image Maa in FIG. 9) photographed by the moving-image photographing means before the photographing of the still image by the still-image photographing means; and a third moving image (e.g., a post-moving image Mbb in FIG. 9) photographed by the moving-image photographing means after the photographing of the still image by the still-image photographing means.

The generating means can generate the incidental moving image on the basis of a first moving image (e.g., the still-image corresponding moving image Mc in FIG. 9) obtained by converting the still image obtained as a result of the photographing by the still-image photographing means into a moving image and a second moving image (e.g., the pre-moving image Maa in FIG. 9) photographed by the moving-image photographing means before the photographing of the still image by the still-image photographing means.

The generating means can generate the incidental moving image on the basis of a first moving image (e.g., the still-image corresponding moving image Mc in FIG. 9) obtained by converting the still image obtained as a result of the photographing by the still-image photographing means into a moving image and a third moving image (e.g., the post-moving image Mbb in FIG. 9) photographed by the moving-image photographing means after the photographing of the still image by the still-image photographing means.

The generating means can add an effect (e.g., a frame Ea in FIG. 9) to the first moving image obtained by converting the still image obtained as a result of the photographing by the still-image photographing means.

The generating means can provide a dummy frame (e.g., dummy frames in D in FIG. 9) before or after or before and after a frame of the first moving image obtained by converting the still image obtained as a result of the photographing by the still-image photographing means.

The generating means can insert shutter sound (e.g., shutter sound shown in FIG. 25), which is outputted according to timing when the first moving image obtained by converting the still image obtained as a result of the photographing by the still-image photographing means is reproduced, into the first moving image.
$ It is possible to further provide first sound acquiring means (e.g., a sound inputting unit 71 and a moving-image processing unit 55 in FIG. 2) for acquiring sound data of sound during the photographing of a moving image by the moving image photographing means and second sound means (e.g., the sound inputting unit 71 and the moving-image processing unit 55 in FIG. 2) for acquiring sound data of sound during the photographing of a still image by the still-image photographing means. The generating means can generate the incidental moving image by multiplexing sound acquired by the first sound acquiring means, which corresponds to the moving image used for generating the incidental moving image, and all or a part of the sound data acquired by the second sound acquiring means, which corresponds to the still image used for generating the incidental moving image (e.g., FIG. 26).

The generating means can provide, when a frame rate of a moving image on a reproduction side is fixed, dummy frames (e.g., dummy frames in D in FIG. 10) in a number enough for maintaining the frame rate before or after or before and after a frame of the first moving image obtained by converting the still image obtained as a result of the photographing by the still-image photographing means.

The generating means can provide, when a frame rate of a moving image on a reproduction side is variable, an arbitrary number of dummy frames (e.g., the dummy frames in D in FIG. 9) before or after or before and after a frame of the first moving image obtained by converting the still image obtained as a result of the photographing by the still-image photographing means.

The generating means can extract a predetermined moving image (e.g., frames Ma4 to Ma17 in E in FIG. 9) out of moving images (e.g., frames Ma1 to Ma17 in FIG. 9) photographed by the moving-image, photographing means and generate the incidental moving image from the moving image extracted and a moving image obtained by converting the still image obtained as a result of the photographing by the still-image photographing means.

The generating means can extract, when the moving image photographed by the moving-image photographing means is formed by using inter-frame compression, a moving image headed by a frame for which only intra-frame compression is used or a frame (e.g., an i picture) forming a basis of the inter-frame compression.

Figure 18:
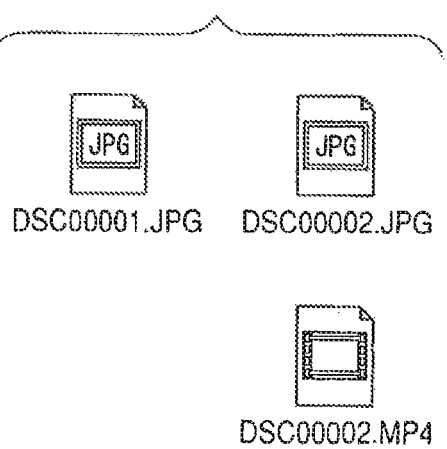
FIG. 18 is a diagram showing a file structure recorded in a recording medium 15 in FIG. 1.

The recording means can record the still image obtained as a result of the photographing by the still-image photographing means and the incidental moving image generated by the generating means under the same file name (e.g., DSC0002 shown in FIG. 18).

It is possible to further provide display control means for displaying a UI image (e.g., an image shown in FIGS. 12 to 16) corresponding to a recorded image during the recording by the recording means A first recording method according to the invention is characterized by including: a setting step (e.g., processing by a control-signal inputting unit 61 and the central control unit 62 in FIG. 2) of performing setting of a still-image-with-moving-image photographing mode; a still-image photographing step (e.g., steps S43, S52, S61, and S81 in FIG. 5) of performing photographing of a still image when a still-image photographing request is received while the still-image-withmoving-image photographing mode is set; a moving-image photographing step (e.g., step S1 in FIG. 3 and steps S44, S53, S54, and S74 in FIG. 5) of performing photographing of a moving image while the still-image-with-moving-image photographing mode is set; a generating step (e.g., steps S72 to S75 in FIG. 5) of generating one incidental moving image on the basis of a still image obtained as a result of the photographing in processing in the still-image photographing step and a moving image obtained as a result of the photographing in processing in the moving-image photographing step; and a recording step (e.g., step S83 in FIG. 5) of recording the still image obtained as a result of the photographing in the processing in the still-image photographing step and the incidental moving image generated in the processing in the generating step.

A second recording apparatus according to the invention is characterized by including: setting means (e.g., the setting switch 28 in FIG. 1) for performing setting of a still-image-with-moving-image photographing mode; still-image photographing means (e.g., the central control unit 62, the camera control unit 52, and the still-image processing unit 53 in FIG. 2) for performing photographing of a still image when a still-image photographing request is received while the still-image-with-moving-image photographing mode is set; moving-image photographing means (e.g., the central control unit 62, the camera control unit 52, and the moving-image processing unit 55 in FIG. 2) for performing photographing of a moving image while the still-image-with-moving-image photographing mode is set; and recording means (e.g., the file managing unit 57 and the recording medium 15 in FIG. 2) for recording a still image obtained as a result of the photographing by the still-image photographing means, a moving image photographed by the moving-image photographing means before the photographing of the still image by the still-image photographing means, and a moving image photographed by the moving-image photographing means after the photographing of the still image by the still-image photographing means as different files.

A first reproducing apparatus according to the invention that reproduces an image recorded by a recording apparatus characterized by including setting means for performing setting of a still-image-with-moving-image photographing mode, still-image photographing means for performing photographing of a still image when a still-image photographing request is received while the still-image-with-moving-image photographing mode is set, moving-image photographing means for performing photographing of a moving image while the still-image-with-moving-image photographing mode is set, generating means for generating one incidental moving image on the basis of a still image obtained as a result of the photographing by the still-image photographing means and a moving image obtained as a result of the photographing by the moving-image photographing means, and recording means for recording the still image obtained as a result of the photographing by the still-image photographing means and the incidental moving image generated by the generating means is characterized by including: first reproducing means (e.g., the central control unit 62 and the still-image processing unit 53 in FIG. 2) for reproducing, when reproduction of a still image photographed in the still-image-with-moving-image photographing mode is requested, the still image obtained as a result of the photographing by the still-image photographing means, which is recorded in the recording means of the recording apparatus; and second reproducing means (e.g., the central control unit 62 and the moving-image processing unit 55 in FIG. 2) for reproducing, when reproduction of a moving image photographed in the still-image-with-moving-image photographing mode is requested, the incidental moving image generated by the generating means, which is recorded in the recording means of the recording apparatus.

Figure 20:
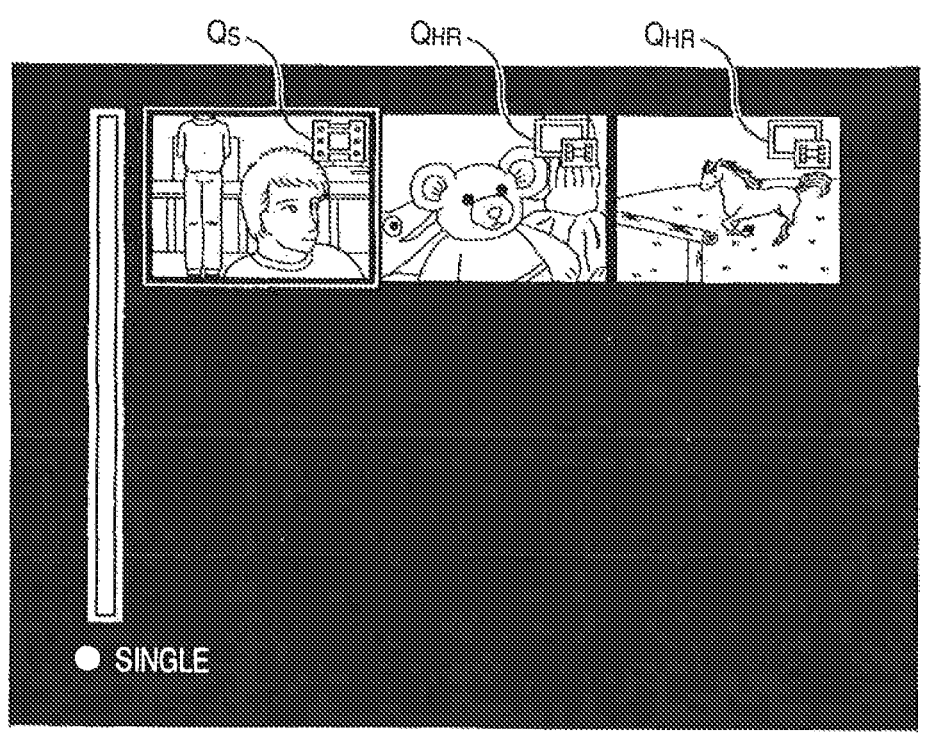
FIG. 20 is a diagram showing an example of display of thumbnails.

It is possible to further provide display control means for displaying a thumbnail image of an image recorded in the still-image-with-moving-image photographing setting mode and cause the display control means to add an indication that the image is photographed in the photographing-with-moving-image setting mode to the thumbnail image (e.g., an icon QHR shown in FIG. 20).

A first reproducing method according to the invention of reproducing an image recorded by a recording apparatus characterized by including setting means for performing setting of a still-image-with-moving-image photographing mode, still-image photographing means for performing photographing of a still image when a still-image photographing request is received while the still-image-with-moving-image photographing mode is set, moving-image photographing means for performing photographing of a moving image while the still-image-with-moving-image photographing mode is set, generating means for generating one incidental moving image on the basis of a still image obtained as a result of the photographing by the still-image photographing means and a moving image obtained as a result of the photographing by the moving-image photographing means, and recording means for recording the still image obtained as a result of the photographing by the still-image photographing means and the incidental moving image generated by the generating means is characterized by including: a first reproducing step (e.g., steps S142, S151, S172, S152, S143, and S131 in FIG. 21) of reproducing, when reproduction of a still image photographed in the still-image-with-moving-image photographing mode is requested, the still image obtained as a result of the photographing by the still-image photographing means, which is recorded in the recording means of the recording apparatus; and a second reproducing step (steps S145, S161, S173, S174, S162, S146, and S132 in FIG. 21) of reproducing, when reproduction of a moving image photographed in the still-image-with-moving-image photographing mode is requested, the incidental moving image generated by the generating means, which is recorded in the recording means of the recording apparatus.

A second reproducing apparatus according to the invention that reproduces an image recorded by a recording apparatus characterized by including setting means for performing setting of a still-image-with-moving-image photographing mode, still-image photographing means for performing photographing of a still image when a still-image photographing request is received while the still-image-with-moving-image photographing mode is set, moving-image photographing means for performing photographing of a moving image while the still-image-with-moving-image photographing mode is set, and recording means for recording a still image obtained as a result of the photographing by the still-image photographing means, a moving image photographed by the moving-image photographing means before the photographing of the still image by the still-image photographing means, and a moving image photographed by the moving-image photographing means after the photographing of the still image by the still-image photographing means as different files is characterized by including: first reproducing means (e.g., the central control unit 62 and the still-image processing unit 53 in FIG. 2) for reproducing, when reproduction of a still image photographed in the still-image-with-moving-image photographing mode is requested, the still image obtained as a result of the photographing by the still-image photographing means, which is recorded in the recording means of the recording apparatus; and second reproducing means (e.g., the central control unit 62 and the moving-image processing unit 55 in FIG. 2) for generating, when reproduction of a moving image photographed in the still-image-with-moving-image photographing mode is requested, one incidental moving image on the basis of the still image obtained as a result of the photographing by the still-image photographing means and the moving image obtained as a result of the photographing by the moving-image photographing means and reproduces the incidental moving image.

FIG. 1 shows an example of a structure of a digital camera 1 to which the invention is applied. This digital camera 1 can normally photograph a still image and a moving image (has a still-image photographing mode and a moving-image photographing mode) and can automatically photograph a still image and moving images for a predetermined time before and after the still image (has a still-image-with-moving-image photographing mode). The digital camera 1 can reproduce images photographed in the respective modes.

A CPU (Central Processing Unit) 11 executes various kinds of processing in accordance with a program recorded in a ROM (Read Only Memory) 12. Data and the like necessary when the CPU 11 executes the various kinds of processing are also stored in the RAM 13 as appropriate.

A drive 14 records image data and the like supplied from the CPU 11 in a recording medium 15 formed by a magnetic disk, an optical disk, a magneto-optical disk, a hard disk, a semiconductor memory, or the like and reads out the image data recorded in the recording medium 15 and supplies the image data to the CPU 11.

It is also possible that, when the recording medium 15 is removable and a program running on the digital camera 1 is stored in the recording medium 15, the drive 14 reads out the program from the recording medium 15 and the CPU 11 executes the program.

A camera unit 21 includes a lens and a CCD (Charged Coupled Device) and supplies image data (a 10-bit digital signal) obtained as a result of imaging to an image processing unit 22.

The image processing unit 22 applies image processing such as gamma conversion, color space conversion, and white balance to the image data supplied from the camera unit 21 and supplies image data (a digital signal of a YUV (4:2:2) or YUV (4:2:0) format) obtained as a result of the image processing to the CPU 11.

A still-image codec unit 23 applies JPEG (Joint Photographic Experts Group) compression processing to the image data (digital image data of the YUV format) processed by the image processing unit 22, which is supplied from the CPU 11, and returns image data (image data of a still image) obtained as a result of the JPEG compression processing to the CPU 11. The still-image codec unit 23 applies JPEG expansion processing to JPEG-compressed image data stored in, for example, the recording medium 15, which is supplied from the CPU 11, and returns image data (digital image data of the YUV format) of the still image obtained as a result of the JPEG expansion processing to the CPU 11.

A moving-image codec unit 24 applies MPEG (Moving Picture Experts Group) compression processing to moving image data (YUV digital image data) processed by the image processing unit 22, which is supplied from the CPU 11, and returns image data of a moving image obtained as a result of the MPEG compression processing to the CPU 11. The moving-image codec unit 24 applies MPEG expansion processing to MPEG-compressed image data stored in, for example, the recording medium 15, which is supplied from the CPU 11, and returns image data (digital image data of the YUV format) of a moving image obtained as a result of the MPEG expansion processing to the CPU 11.

A display control unit 25 converts the image data (YUV digital image data) supplied from the CPU 11 into an RGB signal and supplies the RGB signal to a display unit 26 formed by an LCD (Liquid Crystal Display) or the like and causes the display unit 26 to display the image data.

A shutter switch 27 is a switch operated by a user in photographing a still image.

A still-image-with-moving-image photographing-mode setting switch 28 is a switch operated by the user in setting a still-image-with-moving-image photographing mode. Although the still-image-with-moving-image photographing mode is set using the still-image-with-moving-image photographing-mode setting switch 28 in this example, setting of the still-image-with-moving-image photographing mode may be performed using a GUI (Graphical User Interface) such as a menu screen.

An operation button group 29 is a button group necessary when the user operates the digital camera 1 such as a cross key and a determination button. The still-image photographing mode for photographing a normal still image and the moving-image photographing mode for photographing a normal moving image are set by operating predetermined buttons of this operation button group 29.
$ A microphone 30 supplies a sound signal obtained as a result of sound collection to a sound-signal processing unit 31.
$ The sound processing unit 31 applies predetermined sound processing to the sound signal inputted from the microphone 30 and supplies sound data obtained as a result of the sound processing to the CPU 11.
$ A sound codec unit 32 applies MPEG audio compression processing to the sound data processed by the sound-signal processing unit 31 and returns sound data obtained as a result of the MPEG audio compression processing to the CPU 11. The sound codec unit 32 applies MPEG expansion processing to MPEG-compressed sound data recorded in, for example, the recording medium, which is supplied from the CPU 11, and returns sound data obtained as a result of the MPEG expansion processing to the CPU 11.
$ An output control unit 33 outputs the sound data supplied from the CPU 11 via a speaker 34.
$ FIG. 2 shows an example of a functional structure of the digital camera 1.

An image-data inputting unit 51 inputs image data captured by the camera unit 21 (FIG. 1) and supplies the inputted image data to a camera control unit 52.

The camera control unit 52 generates image data (e.g., 2592×1944 dots) for a still image from the image data supplied from the image-data inputting unit 51 and supplies the image data to a still-image processing unit 53 or generates image data (320×240 dots) for a moving image from the image data supplied from the image-data inputting unit 51 and supplies the image data to a moving-image processing unit 55 in accordance with the control by the central control unit 62.

The still-image processing unit 53 requests the still-image codec unit 23 to apply the JPEG compression processing to the image data of the still image supplied from the camera control unit 52 and supplies image data of a still image obtained as a result of the JPEG compression processing, which is supplied from the still-image codec unit 23, to a file managing unit 57 in accordance with the control by the central control unit 62.

When the still-image processing unit 53 records a still image photographed in the still-image-with-moving-image photographing mode, the still-image processing unit 53 temporarily stores image data compressed by the JPEG compression processing in a still-image storing unit 54 formed by a RAM 13 (FIG. 1).

$

The still-image processing unit 53 requests the still-image codec unit 23 to apply the JPEG expansion processing to the JPEG-compressed image data recorded in the recording medium 15 and supplies image data obtained as a result of the JPEG expansion processing, which is supplied from the still-image coded unit 23, to the central control unit 62 in accordance with the control by the central control unit 62.

The moving-image processing unit 55 requests the moving-image codec unit 24 to apply the MPEG compression processing to the image data of the moving image supplied from the camera control unit 52 and supplies image data obtained as a result of the MPEG compression processing, which is supplied from the moving-image codec unit 24, to the file managing unit 57 in accordance with the control by the central control unit 62. In that case, the moving-image processing unit 55 requests the sound codec unit 32 to apply the MPEG compression processing to sound data corresponding to a moving image supplied from a sound inputting unit 71 and supplies sound data obtained as a result of the MPEG compression processing, which is supplied from the sound codec unit 32, to the file managing unit 57.

When the moving-image processing unit 55 records a moving image photographed in the still-image-with-moving-image photographing mode, the moving-image processing unit 55 stores the image data supplied from the camera control unit 52 and the sound data supplied from the sound inputting unit 71 in a moving-image storing unit 56 formed by the RAM 13 and generates a moving image described later using the image data and the like stored therein.

The moving-image processing unit 55 requests the moving-image codec unit 24 to apply the MPEG expansion processing to the MPEG-compressed image data stored in the recording medium 15, which is supplied from the file managing unit 57, and supplies image data of a moving image obtained as a result of the MPEG expansion processing, which is supplied from the moving-image codec unit 24, to the central control unit 62 in accordance with the control by the central control unit 62. In that case, the moving-image processing unit 55 requests the sound codec unit 32 to apply the MPEG expansion processing to the MPEG-compressed sound data recorded in the recording medium 15, which is supplied from the file managing unit 57, and supplies sound data obtained as a result of the MPEG expansion processing, which is supplied from the sound codec unit 32, to the central control unit 62.

The file-managing unit 57 records the image data and the like supplied from the still-image processing unit 53 and the moving-image processing unit 55 in the recording medium 15. The file managing unit 57 supplies the image data and the like stored in the recording medium 15 to the still-image processing unit 53 or the moving-image processing unit 55 according to requests from the still-image processing unit 53 and the moving-image processing unit 55.

A control-signal inputting unit 61 inputs a signal corresponding to operation of the shutter switch 27 or the operation button group 29 by the user and supplies the signal to the central control unit 62.

The central control unit 62 controls the camera control unit 52, the still-image processing unit 53, and the moving-image processing unit 55 according to the signal inputted from the control-signal inputting unit 61 to cause the units to perform photographing of a still image or a moving image in the normal still-image photographing mode or moving-image photographing mode and reproduction of the image, photographing of an image in the still-image-with-moving-image photographing mode and reproduction of the image, and the like.

$

Now, operations of the digital camera 1 at the time when the still-image-with-moving-image photographing-mode setting switch 28 is operated and the still-image-with-moving-image photographing mode is set will be explained with reference to a flowchart in FIG. 3.

Figure 4:
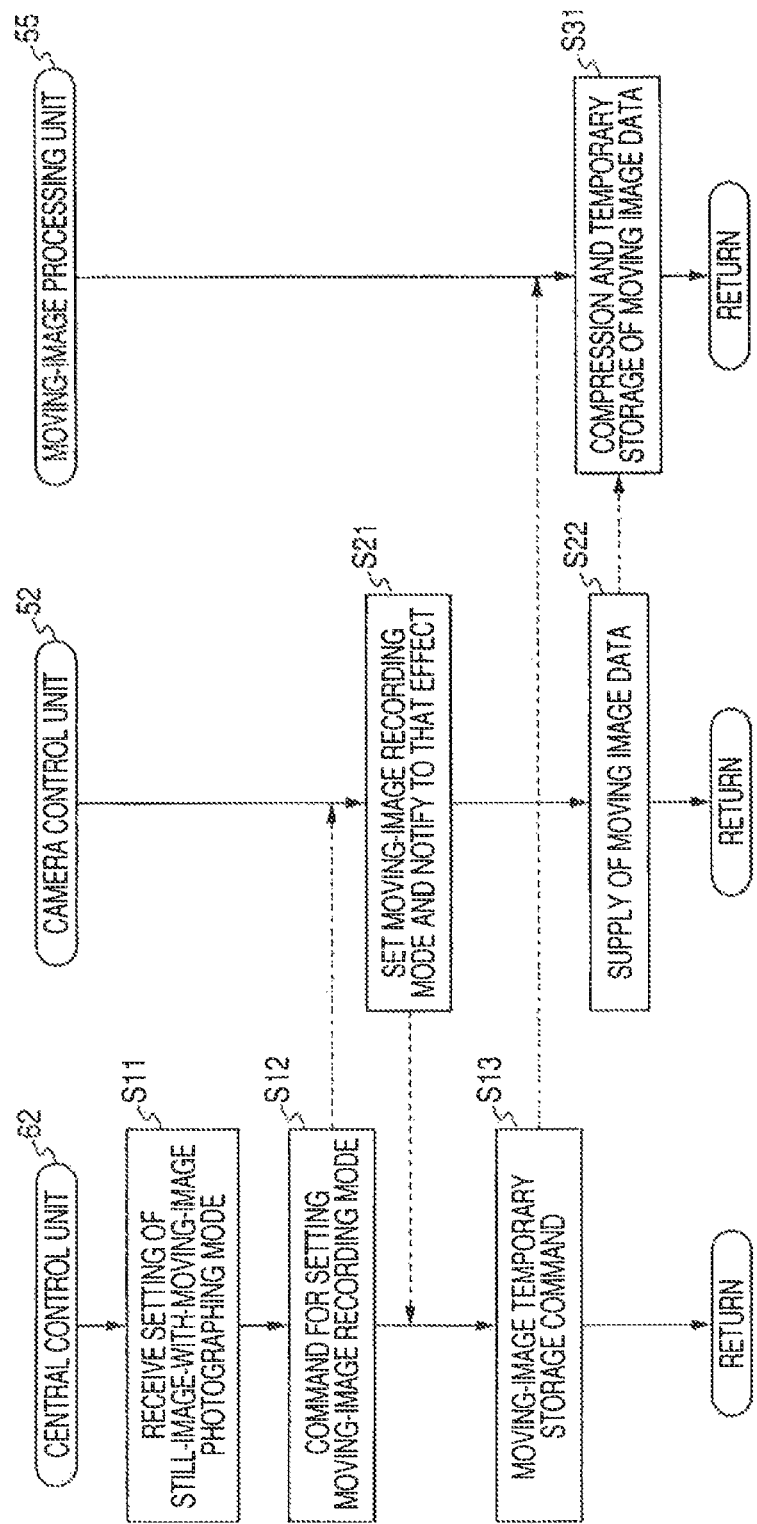
FIG. 4 is a flowchart for explaining details of moving-image-temporary-storage processing in step S1 in FIG. 3.

In step S1, moving-image temporary storage processing is started. Details of the processing are shown in FIG. 4.

In step S11, the central control unit 62 of the digital camera 1 receives a signal indicating that the still-image-with-moving-image photographing-mode setting switch 28 is operated and the still-image-with-moving-image photographing mode is set from the control-signal inputting unit 61. In step S12, the central control unit 62 notifies the camera control unit 52 of a command for setting an operation mode of the camera control unit 52 in the moving-image recording mode.

In step S21, the camera control unit 52 sets the operation mode of the camera control unit 52 in the moving-image recording mode and, when the setting is completed, notifies the central control unit 62 to that effect. When the operation mode is set in the moving-image recording mode, the camera control unit 52 generates image data (320×240 dots) of a moving image from the image data supplied from the image-data inputting unit 51 and performs processing for supplying the image data to the moving-image processing unit 55 in response to a request.

When the central control unit 62 receives the notification of the completion of the moving-image recording mode setting from the camera control unit 52, in step S13, the central control unit 62 outputs a moving-image temporary storage command to the moving-image processing unit 55.

In step S31, the moving-image processing unit 55 starts the moving-image temporary storage processing.

$

Specifically, the moving-image processing unit 55 requests the camera control unit 52 (the camera control unit 52 in the moving-image recording mode) to supply image data of a moving image. The moving-image processing unit 55 starts the MPEG compression processing for the image data supplied from the camera control unit 52 in response to the request (step S22) and starts storage of image data obtained as a result of the MPEG compression processing in the moving-image storing unit 56. The moving-image storing unit 56 is, for example, a line buffer. When the buffer is filled, image data of an old frame is deleted and image data of a new frame is stored.

$

In that case, the moving-image processing unit 55 starts the MPEG compression processing for a sound signal (a sound signal of sound corresponding to the moving image stored) supplied from the sound inputting unit 71 and starts storage of sound data obtained as a result of the MPEG compression processing in the moving-image storing unit 56.

Figure 3:
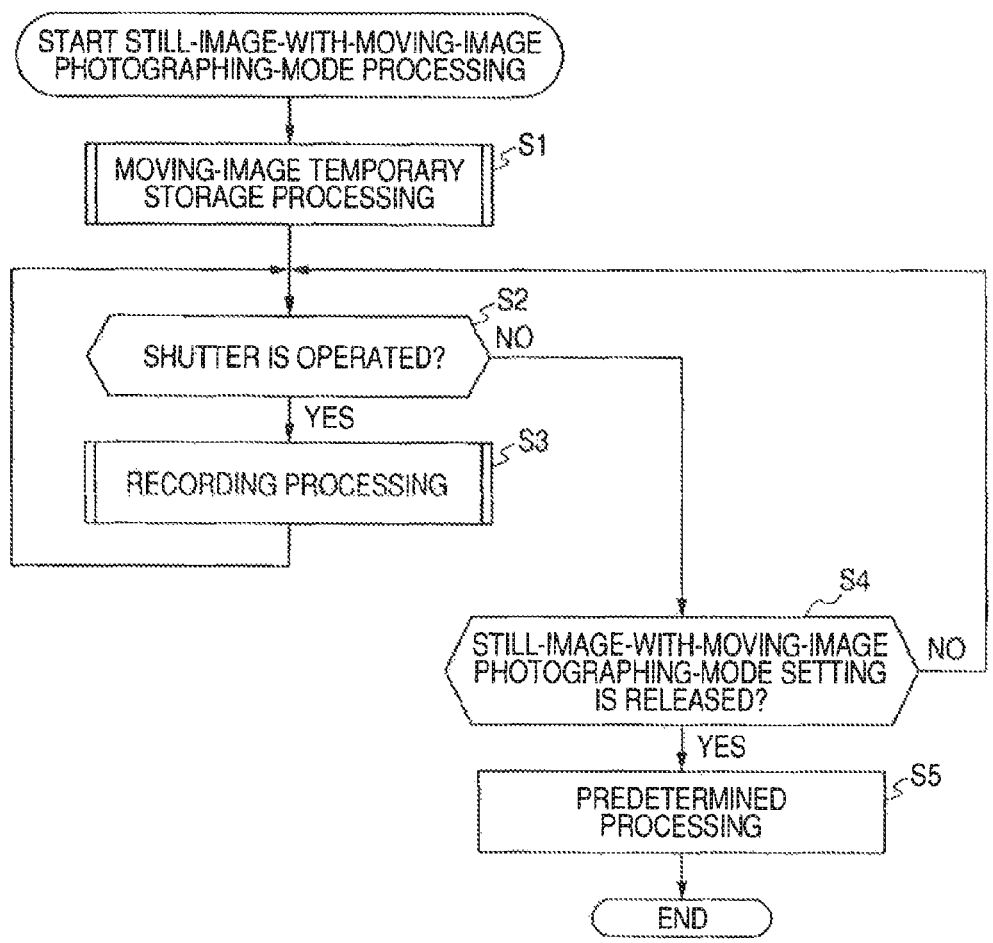
FIG. 3 is a flowchart for explaining operations at the time of a still-image-with-moving-image photographing mode.

When the moving-image temporary storage is started in this way, the processing proceeds to step S2 in FIG. 3. In the case of this example, when the still-image-with-moving-image photographing mode is set, the moving-image temporary storage is started. However, it is also possible to start the moving-image temporary storage when the power supply of the digital camera 1 is turned on or when the recording medium 15 is inserted.

In step S2, it is judged whether the shutter switch 27 is operated. When it is judged that the shutter switch 27 is operated (the user presses the shutter switch 27), the processing proceeds to step S3.

In step S3, recording processing is performed. Details of the processing are shown in a flowchart in FIG. 5.

When the shutter switch 27 is operated during the moving-image temporary storage (during the moving-image temporary storage started in step S1 in FIG. 3 or step S74 described later), in step S41, the central control unit 62 outputs a command for stopping the moving-image temporary storage to the moving-image processing unit 55. In step S71, the moving-image processing unit 55 stops the moving-image temporary storage (stops the storage of the moving image and the sound) and notifies the central control unit 62 that the moving-image temporary storage is stopped.

When the moving-image temporary storage is stopped, in step S42, the central control unit 62 outputs a command for setting the operation mode of the camera control unit 52 in the still-image recording mode to the camera control unit 52.

In step S51, when the operation mode is set in the still-image recording mode and the setting is completed, the camera control unit 52 notifies the central control unit 62 to that effect. When the operation mode is set in the still-image recording mode, the camera control unit 52 performs processing for generating image data (2592×1944 dots) of a still image data from the image data supplied from the image-data inputting unit 51 and supplying the image data to the still-image processing unit 53 in response to a request.

When the completion of the still-image record mode setting is notified from the camera control unit 52, in step S43, the central control unit 62 outputs a still-image recording command to the still-image processing unit 53.

In step S61, the still-image processing unit 53 performs still-image recording processing. Specifically, the still-image processing unit 53 requests the camera control unit 52 (the camera control unit 52 in the still-image recording mode) to supply image data of a still image, applies the JPEG compression processing to image data of a still image supplied from the camera control unit 52 in response to the request (step S52) (image data of one frame imaged at the point when the shutter switch 27 is depressed), and stores image data obtained as a result of the JPEG compression processing in the still-image storing unit 54.

The still-image processing unit 53 applies reduction processing to the image data of the still image supplied from the camera control unit 52 and also applies the JPEG compression processing to the image data to generate a thumbnail image.

The still-image processing unit 53 includes the thumbnail image in the image data stored in the still-image storing unit 54 and supplies the image data to the file managing unit 57.

When the image data is supplied from the still-image processing unit 53, in step S81, the file managing unit 57 records the image data in the recording medium 15. Detailed processing of the recording is shown in a flowchart in FIG. 6.

Figures 6, 7, 8:
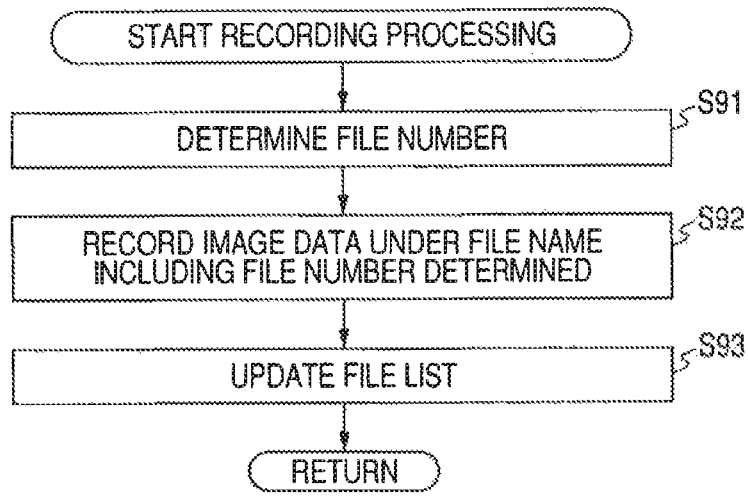
FIG. 6 is a flowchart for explaining details of recording processing in step S81 in FIG. 5.
FIG. 7 is a diagram showing an example of a file list.
FIG. 8 is a diagram showing another example of the file list.

In step S91, with reference to, for example, a file-list shown in FIG. 7 managed by the file managing unit 57, the file managing unit 57 adds 1 to a largest number among file numbers set in the file list and sets a value obtained as a result of the addition as a file number of the image data (sets a number not used in the file list as a file number of the image data to be recorded).

In the example in FIG. 7, since a number 2 is the largest number, a number 3 obtained by adding 1 to the number 2 is a file number of the image data to be recorded.

Details of the file list will be described later.

In step S92, the file managing unit 57 attaches an extension for a still image to a file name including the file number determined in step S91 and stores the image data supplied from the still-image processing unit 53 in a predetermined folder and records the image data in the recording medium 15.

For example, the file name has a form of DSCXXXXX. The file number is incorporated in the part "XXXXX" in the file name. In the example in FIG. 7, since the file number is 3 (00003), the file name is DSC00003 and the image data is recorded with JPG as an extension for a still image attached to the file name (DSC00003.JPG).

In step S93, the file managing unit 57 adds the file number used in the file name and information (Hybrid REC) indicating that the still image is photographed in the still-image-with-moving-image photographing mode to spaces of "file number" and "file type" of the file list, respectively. In other words, the file list in FIG. 7 is updated with the file number 3 and the information (Hybrid REC) added thereto as shown in FIG. 8.

Figure 5:
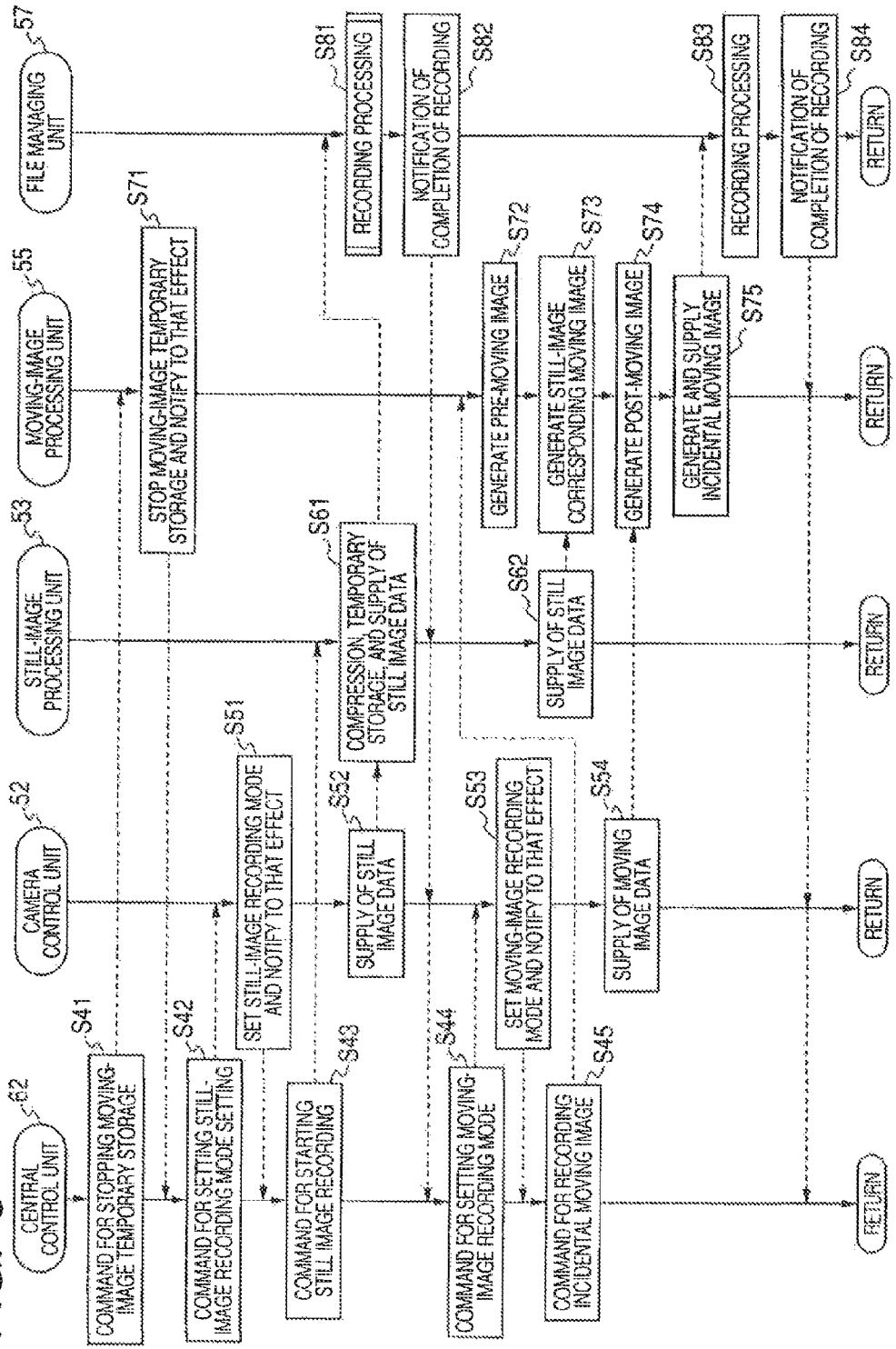
FIG. 5 is a flowchart for explaining details of recording processing in step S3 in FIG. 3.

When the image data of the still image is recorded in this way, the processing proceeds to step S82 in FIG. 5. The file managing unit 57 notifies the central control unit 62, via the still-image processing unit 53 and the camera control unit 52, that the recording of the image data of the still image is completed.

When the recording of the image data of the still image is completed, in step S44, the central control unit 62 outputs a moving-image-recording-mode setting command to the camera control unit 52.

In step S53, as in the case in step S21 in FIG. 4, the camera control unit 52 sets the operation mode in the moving-image recording mode and, when the setting is completed, notifies the central control unit 62 to that effect.

When the operation mode of the camera control unit 52 is set in the moving-image recording mode, in step S45, the central control unit 62 outputs a command for recording a moving image photographed in the still-image-with-moving-image photographing mode (hereinafter referred to as incidental moving image) to the moving-image processing unit 55.

When the moving-image processing unit 55 receives this command, in step S72, the moving-image processing unit; 55 creates a pre-moving image Maa.

Specifically, the moving-image processing unit 55 extracts predetermined image data as image data of the pre-moving image Maa from the image data of the moving image stored in the moving-image storing unit 56 according to the moving-image temporary storage performed until being stopped in step S71.

Figure 9:
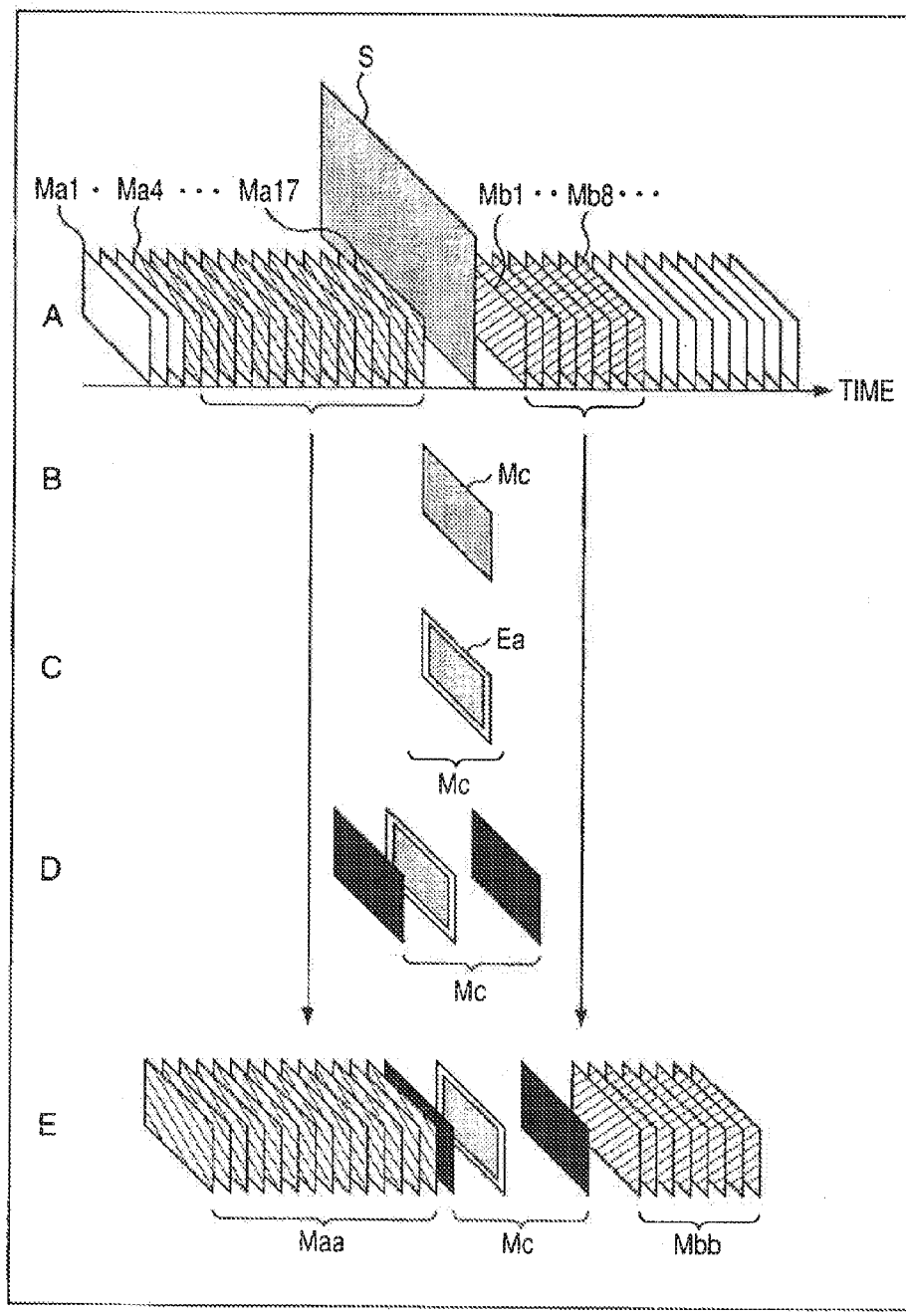
FIG. 9 is a diagram for explaining a still image and an incidental moving image, recorded in the still-image-with-moving-image photographing mode.

For example, as shown in A in FIG. 9, frames Ma1 to Ma17 of a moving image (frames of a moving image photographed immediately before the shutter switch 27 is operated) are stored in the moving-image storing unit 56. Then, a frame Ma4, which is a frame a predetermined time back from the frame Ma17, to the frame Ma17 are extracted as image data of the pre-moving image Maa. A frame S represents the still image photographed in the still-image-with-moving-image photographing mode (the still image compressed in step S61).
$ The moving-image processing unit 55 also extracts sound data corresponding to the moving image, which is extracted as the pre-moving image Maa, from the sound data stored in the moving-image storing unit 56 according to the moving-image temporary storage performed until being stopped in step S71.

Referring back to FIG. 5, in step S73, the moving-image processing unit 55 generates a moving image corresponding to the still image photographed (hereinafter referred to as still-image corresponding moving image) Mc.

Specifically, the moving-image processing unit 55 requests, via the central control unit 62, the still-image processing unit 53 to supply the image data of the still image stored in step S61 (in the case of the example in A in FIG. 9, the image data of the frame S). The moving-image processing unit 55 converts the image data of the still image from the still-image processing unit 53, which is supplied via the central control unit 62, into image data of a moving image and generates image data of the still-image corresponding moving image Mc shown in B in FIG. 9. In other words, the image data of the still image of 2592×1944 dots is converted into image data of 320×240 dots.

At this point, as shown in C in FIG. 9, it is possible to generate the still-image corresponding moving image Mc by adding an effect such as a frame Ea thereto (such that the still image is displayed while being surrounded by the frame Ea).

Further, as shown in D in FIG. 9, it is also possible to generate the still-image corresponding moving image Mc by providing dummy frames formed by image data of a black color before and after a frame of the moving image obtained from the still image (such that screens having a black background are displayed before and after the still image). In the example in D in FIG. 9, the dummy frames are provided before and after the frame of the moving image obtained from the still image. However, it is also possible to provide a dummy frame only before or only after the frame.

Besides, it is also possible to add effects described below.

Fade-in or fade-out from a moving image to a still image or from a still image to a moving image Wipe processing from a moving image to a still image or from a still image to a moving image Mix processing from a moving image to a still image or from a still image to a moving image Display of a still image in sepia, negative/positive, or monotone Animation-in from the upper right or animation-out to the upper right of a still image Animation for enlarging a still image from a small state to a full screen Referring back to FIG. 5, in step S74, the moving-image processing unit 55 creates a post-moving image Mbb.

Specifically, the moving-image processing unit 55 requests the camera control unit 52 (the camera control unit 52 in the moving-image recording mode) to supply image data of a moving image. The moving-image processing unit 55 applies the MPEG compression processing to image data of a moving image supplied from the camera control unit 52 (step S54) to compress the image data and starts temporary storage of the image data in the moving-image storing unit 56. A scene after the shutter switch 27 is pressed is stored as a moving image. In starting the storage, contents stored in the moving-image storing unit 56 are initialized (image data stored is deleted).
$ The moving-image processing unit 55 also starts storage of a-sound signal (sound data corresponding to the moving image to be recorded) supplied from the sound inputting unit 71 in the moving-image storing unit 56.

After a certain time has elapsed, the moving-image processing unit 55 generates a post-moving image Mbb from the moving image stored in the moving-image storing unit 56 at that point.

Specifically, predetermined moving-image data is extracted as image data of the post-moving image Mbb from the image data of the moving image stored in the moving-image storing unit 56.

For example, when image data of a frame Mb1 and the subsequent frames shown in A in FIG. 9 is stored in the moving-image storing unit 56, frames Mb1 to Mb8 are extracted as the image data of the post-moving image Mbb.
$ The moving-image processing unit 55 also extracts sound data corresponding to the moving image, which is extracted as the post-moving image, from the sound data stored in the moving-image storing unit 56.

In steps S72 and S74, the predetermined image data is extracted from the image data of the moving image recorded in the moving-image storing unit 56 to generate the pre-moving image Maa and the post-moving image Mbb. In that case, when frames of the moving image form I, B, and P pictures, it is also possible to extract image data headed by the I picture that is reproducible independently.
$ In step S75, the moving-image processing unit 55 generates a moving image of a still image with moving image (an incidental moving image).

Specifically, as shown in E in FIG. 9, the pre-moving image Maa generated in step S72, the still-image corresponding moving image Mc generated in step S73, and the post-moving image Mbb generated in step S74 are arranged in a time series order to generate one moving image.
$ The one moving image generated and sound data corresponding to the pre-moving image Maa and the post-moving image Mbb extracted (steps S72 and S74) are multiplexed to generate an incidental moving image.

Figure 10:
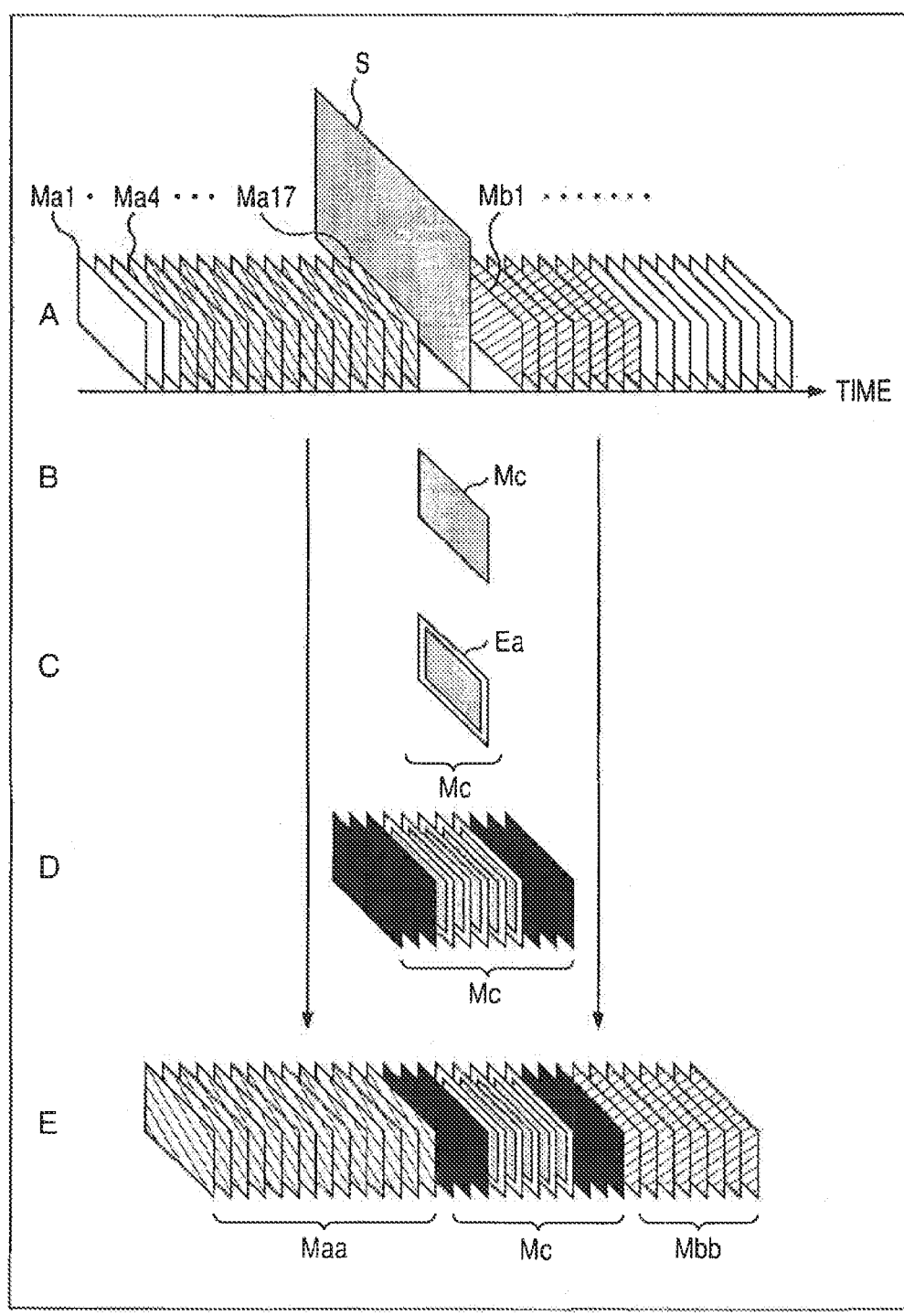
FIG. 10 is another diagram for explaining a still image and an incidental moving image recorded in the still-image-with-moving-image photographing mode.

In the examples in D and E in FIG. 9, a frame rate on a reproduction side is a variable frame rate. However, when the frame rate is a fixed frame rate, as shown in D in FIG. 10 and E in FIG. 10, it is possible to generate an incidental moving image by providing dummy frames enough for fixing the frame rate. A in FIG. 10 to C in FIG. 10 show a frame array same as that in A in FIG. 9 to C in FIG. 9.

The moving-image processing unit 55 supplies the incidental moving image generated to the file-managing unit 57.

When the incidental moving image is supplied from the moving-image processing unit 55, in step S83, the file managing unit 57 records the incidental moving image in the recording medium 15.

Specifically, the file managing unit 57 records, with an extension (MP4) for a moving image attached to a name same as the file name of the still image given in step S92 in FIG. 6, the incidental moving image in the same file in which the image data of the still image is recorded.

When the recording of the incidental moving image is completed, the file managing unit 57 notifies the central control unit 62 to that effect via the moving-image processing unit 55 and the camera control unit 52.

When the recording processing is performed in this way, the processing returns to step S2 in FIG. 3 and the processing in step S2 and the subsequent steps is performed. When the shutter switch 27 is operated again, photographing in the still-image-with-moving-image photographing mode is performed and a still image and an incidental moving image are recorded.

When it is judged in step S2 that the shutter switch 27 is not operated, the processing proceeds to step S4. It is judged whether the setting of the still-image-with-moving-image photographing mode is released. When it is judged that the setting is not released, the processing returns to step S2 and the processing in step S2 and the subsequent steps is performed. On the other hand, when it is judged that the setting is released (e.g., when the still-image-with-moving-image photographing-mode setting switch 28 is operated to release the setting), the processing proceeds to step S5 and an operation corresponding to the setting of the user is performed. For example, thereafter, when the photographing mode is switched to the still-image photographing mode, normal still-image photographing is performed. When the photographing mode is switched to the moving-image photographing mode, normal moving-image photographing is performed.

As described above, photographing in the still-image-with-moving-image photographing mode is performed.

Figure 11:
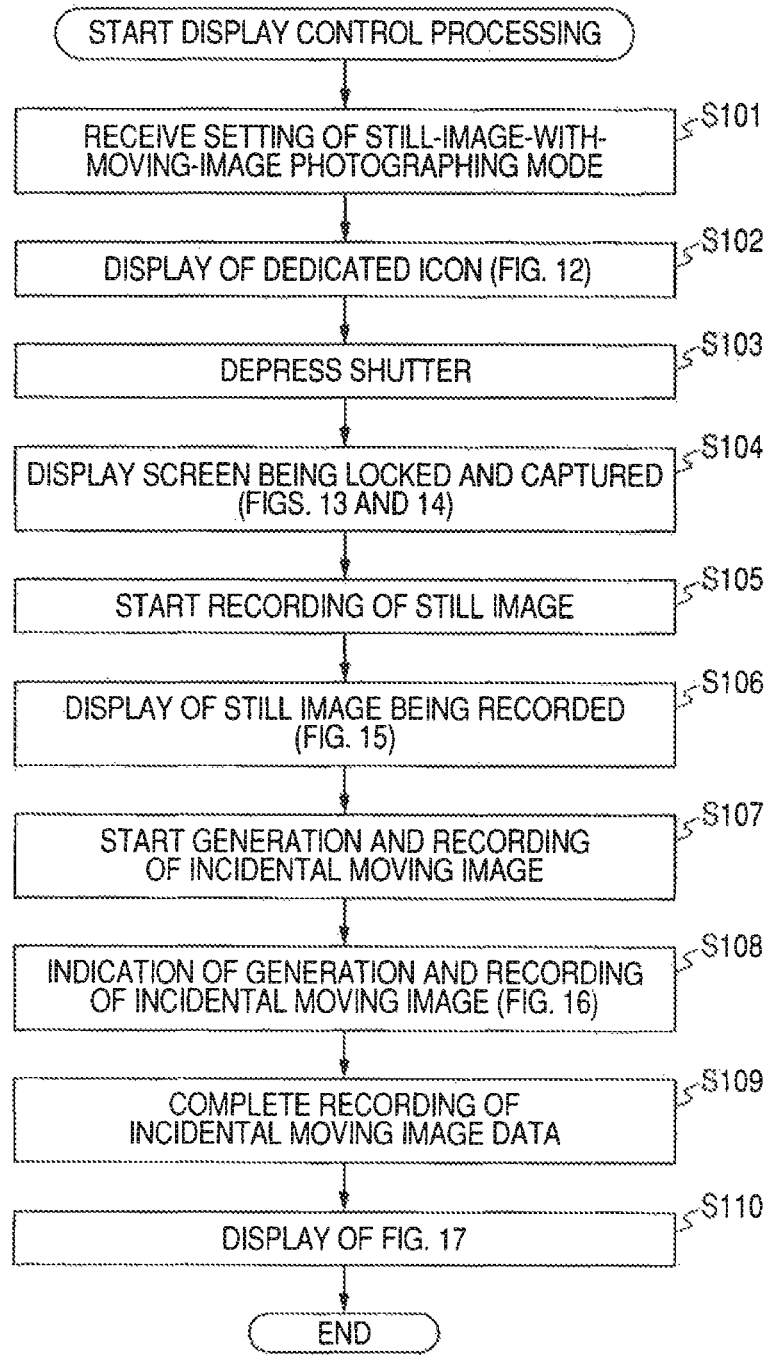
FIG. 11 is a flowchart for explaining display control processing at the time of recording by the still-image-with-moving-image photographing mode.

The recording processing is mainly explained above concerning the still-image-with-moving-image photographing mode. At the time of the recording, display control processing for a UI (user interface) image conforming to processing shown in a flowchart in FIG. 11 explained below is performed.

Figure 12:
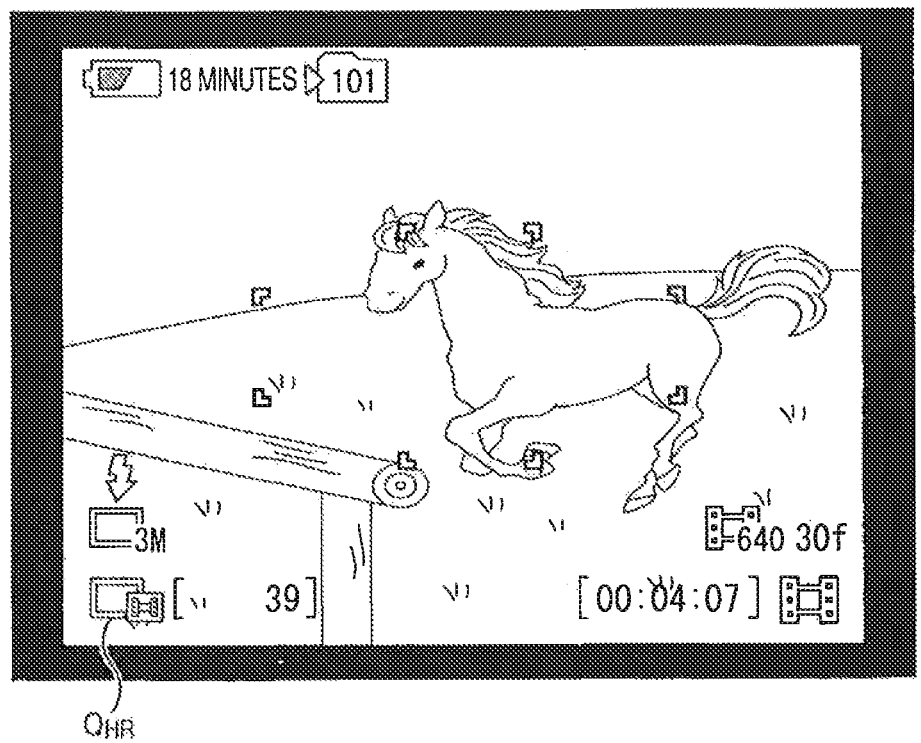
FIG. 12 is a diagram showing an example of display during recording in the still-image-with-moving-image photographing mode.

In step S101, the central control unit 62 of the digital camera 1 receives, from the control-signal inputting unit 61, a signal indicating that the still-image-with-moving-image photographing-mode setting switch 28 is operated and the still-image-with-moving-image photographing mode is set (step S1 in FIG. 3 and step S11 in FIG. 4). In step S102, as shown in FIG. 12, the central control unit 62 continuously displays an image currently photographed, which is supplied from the camera control unit 52, (performs monitor processing using an electronic view finder) and displays, on the image, an icon QHR indicating that the still-image-with-moving-image photographing mode is set.

Figure 13:
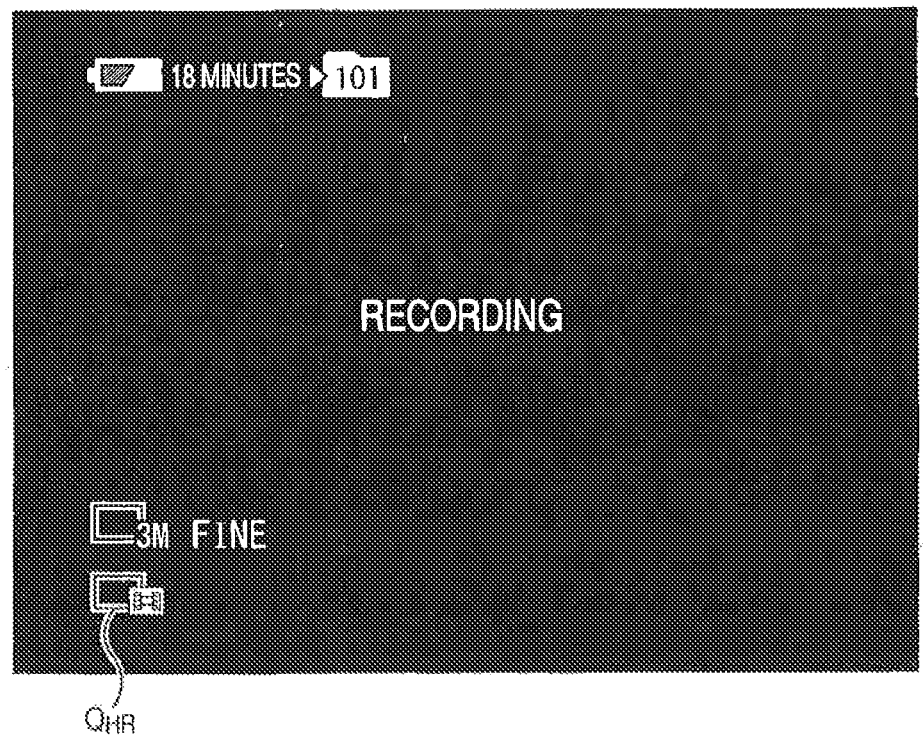
FIG. 13 is a diagram showing another example of display during recording in the still-image-with-moving-image photographing mode.

The shutter switch 27 is operated in step S103 (step S2 in FIG. 3 and step S41 in FIG. 5). Then, in step S104, when the shutter switch 27 is completely pressed, the central control unit 62 switches a display image on the display unit 26 to a screen with characters "recording" attached to a black background as shown in FIG. 13 in order to indicate that the screen is being captured.

Figure 14:
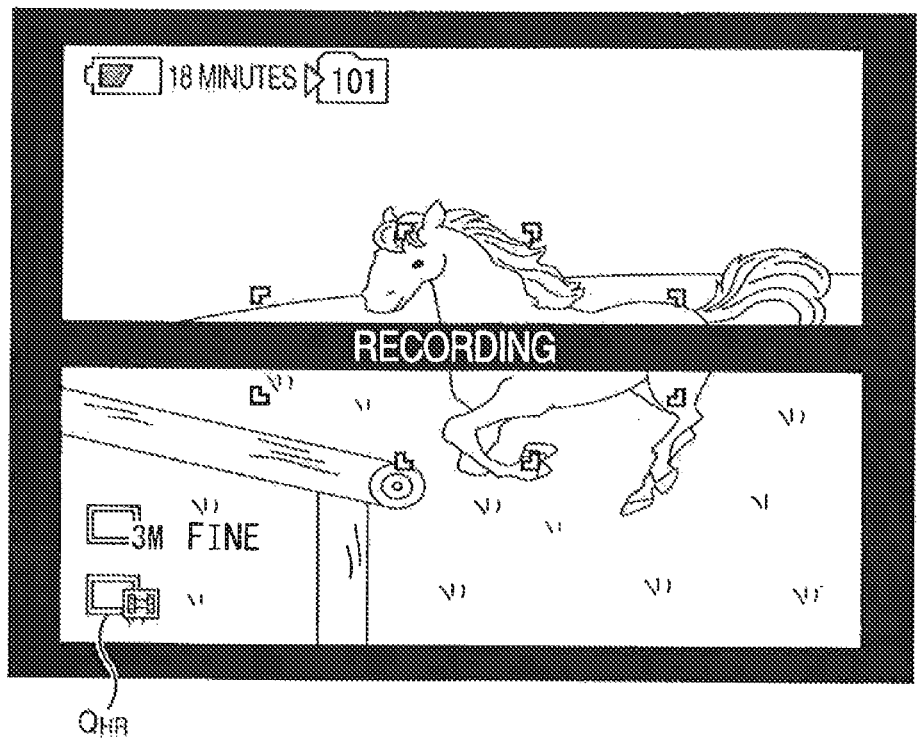
FIG. 14 is a diagram showing still another example of display during recording in the still-image-with-moving-image photographing mode.

When recording of the still image is started in step S105 (step S43 in FIG. 5), in step S106, as shown in FIG. 14, the central control unit 62 displays the still image and displays the characters "recording" in order to indicate that the still image is being recorded.

Figure 15:
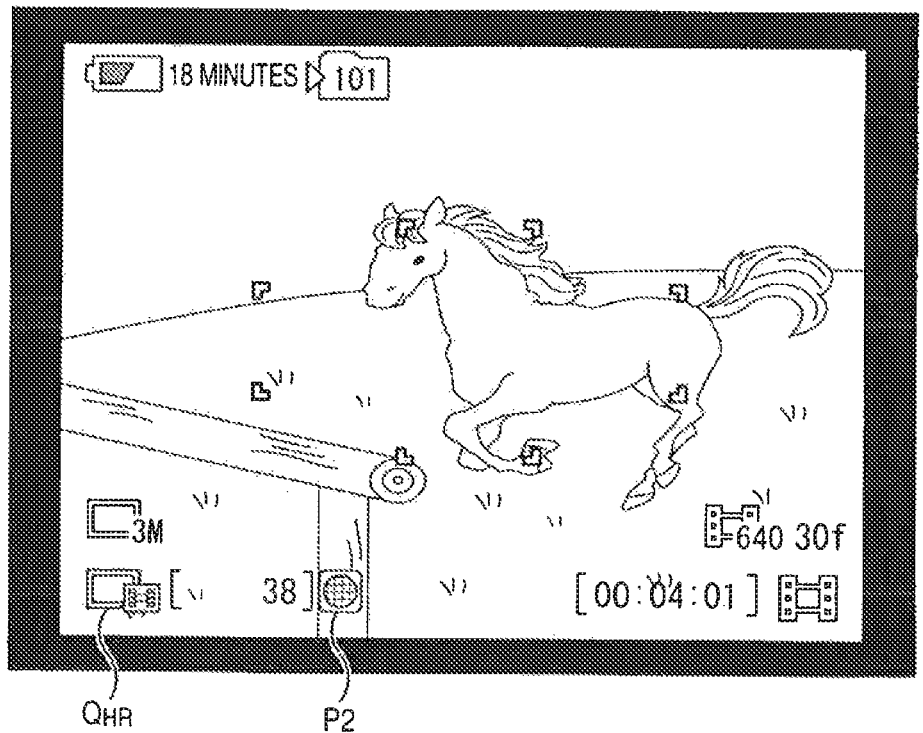
FIG. 15 is a diagram showing still another example of display during recording in the still-image-with-moving-image photographing mode.

When generation and recording of an incidental moving image is started in step S107 (step S45 in FIG. 5), in step S108, as shown in FIG. 15, the central control unit 62 erases the display of "recording" from the screen in FIG. 14 and displays a mark P2 indicating that the incidental moving image is being generated and recorded.

Figure 16:
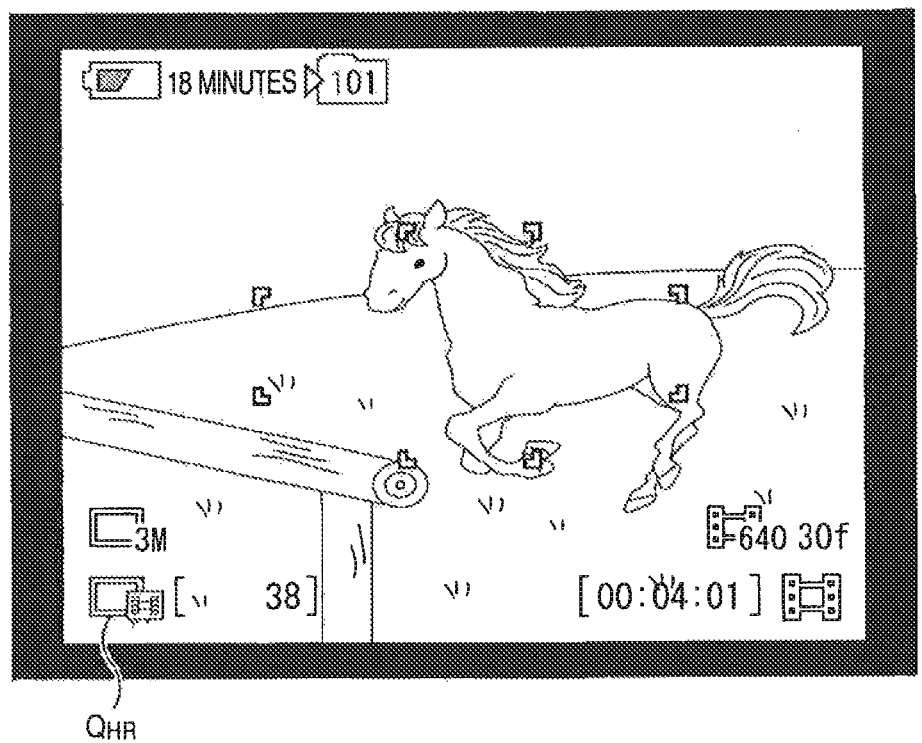
FIG. 16 is a diagram showing still another example of display during recording in the still-image-with-moving-image photographing mode.

When the generation and recording of the incidental moving image is completed in step S109 (a notification to that effect (step S84 in FIG. 5) is received from the file managing unit 57), in step S110, as shown in FIG. 16, the central control unit 62 erases the mark P2 from the screen in FIG. 15.

As described above, the predetermined UI image is displayed during the photographing in the still-image-with-moving-image photographing mode. Thus, the user can easily grasp what kind of processing is being currently performed.

Figure 17:
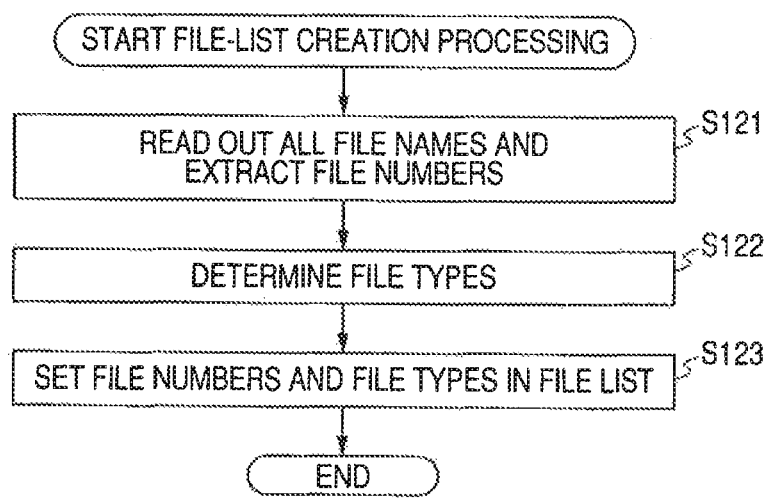
FIG. 17 is a flowchart for explaining file-list creation processing.

Operations of the file managing unit 57 in generating the file list (FIG. 7) will be explained with reference to a flowchart in FIG. 17.

For example, when the recording medium 15 is inserted in the digital camera 1 at the time of power-on, in step S121, the file managing unit 57 reads out all file names present in the recording medium 15 inserted and extracts file numbers forming the file names. When there are plural (two) files having the same file name, one file number is extracted.

For example, as shown in FIG. 18, when files of DSC00001.JPG, DSC00002.JPG, and DSC00002.MP4 are recorded in the recording medium 15, a file number 1 and a file number 2 (since DSC00002.JPG and DSC00002.MP4 has the same file name DSC00002, one file number 2) are extracted from the file name of DSC00001 and the file name DSC00002, respectively.

Referring back to FIG. 17, in step S122, the file managing unit 57 determines a file type for each of the file numbers.

When there is only one same file name, a file type is determined in accordance with an extension attached to the file. For example, in the example in FIG. 18, since there is one file having the file name of DSC00001, in accordance with the extension (JPG) attached to the file, the file is considered to be a file of a still image photographed in the normal still-image photographing mode.

On the other hand, when there are two same file names, in the case of this example, since the files are files with extensions JPG and MP4 attached to the same name and are photographed in the still-image-with-moving-image photographing mode, the files are considered to be files of an image photographed in the still-image-with-moving-image photographing mode.

Next, in step S123, the file managing unit 57 sets the file numbers (step S121) and the file types (step S122) in the file list.

As a result, in the example in FIG. 18, as shown in FIG. 7, a file list in which the file number 1 and information indicating that the file is a file of a still image photographed in the still-image photographing mode (JPEG) and the file number 2 and information indicating that the file is a file of an image photographed in the still-image-with-moving-image photographing mode (Hybrid REC) are set, respectively, is generated.

The file list is generated as described above.

Figure 19:
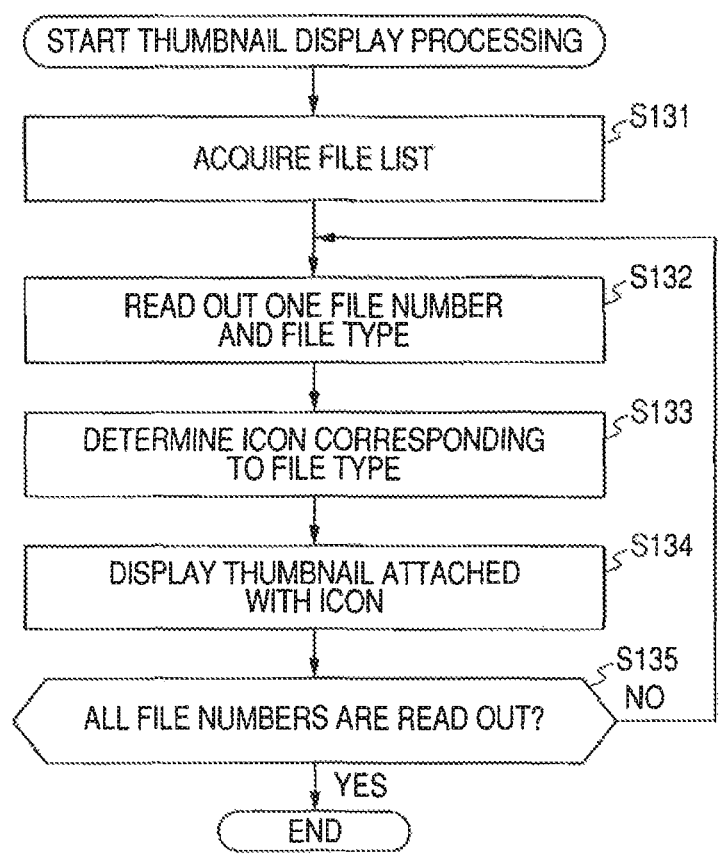
FIG. 19 is a flowchart for explaining thumbnail display processing.

Now, processing for reproducing an image photographed in the still-image-with-moving-image photographing mode will be explained. First, processing for displaying thumbnails used in selecting an image to be reproduced will be explained with reference to a flowchart in FIG. 19.

When the operation group button 29 is operated to request display of thumbnails and an indication to that effect is inputted via the control-signal inputting unit 61, in step S131, the central control unit 62 acquires a file list from the file managing unit 57. In step S132, the central control unit 62 reads out a pair of a file number and a file type set in the file list.

In step S133, the central control unit 62 determines an icon corresponding to the file list read out.

In step S134, the central control unit 62 acquires a thumbnail image of a file name including the file number from the file managing unit 57, attaches the icon determined in step S133 to the thumbnail image, and causes the display unit 26 to display the thumbnail image.

In step S135, the central control unit 62 judges whether all file numbers have been read out from the file list. When it is judged that there are file numbers not read out yet, the processing returns to step S132. The central control unit 62 performs the processing in step S132 and the subsequent steps. On the other hand, when it is judged that all the file numbers have been read out, the central control unit 62 ends the processing.

FIG. 20 shows an example of thumbnail images displayed in this way. An icon QHR is attached to thumbnail images of an image photographed in the still-image-with-moving-image photographing mode and an icon Qs is attached to a thumbnail image of an image photographed in the normal still-image photographing mode.

Figure 21:
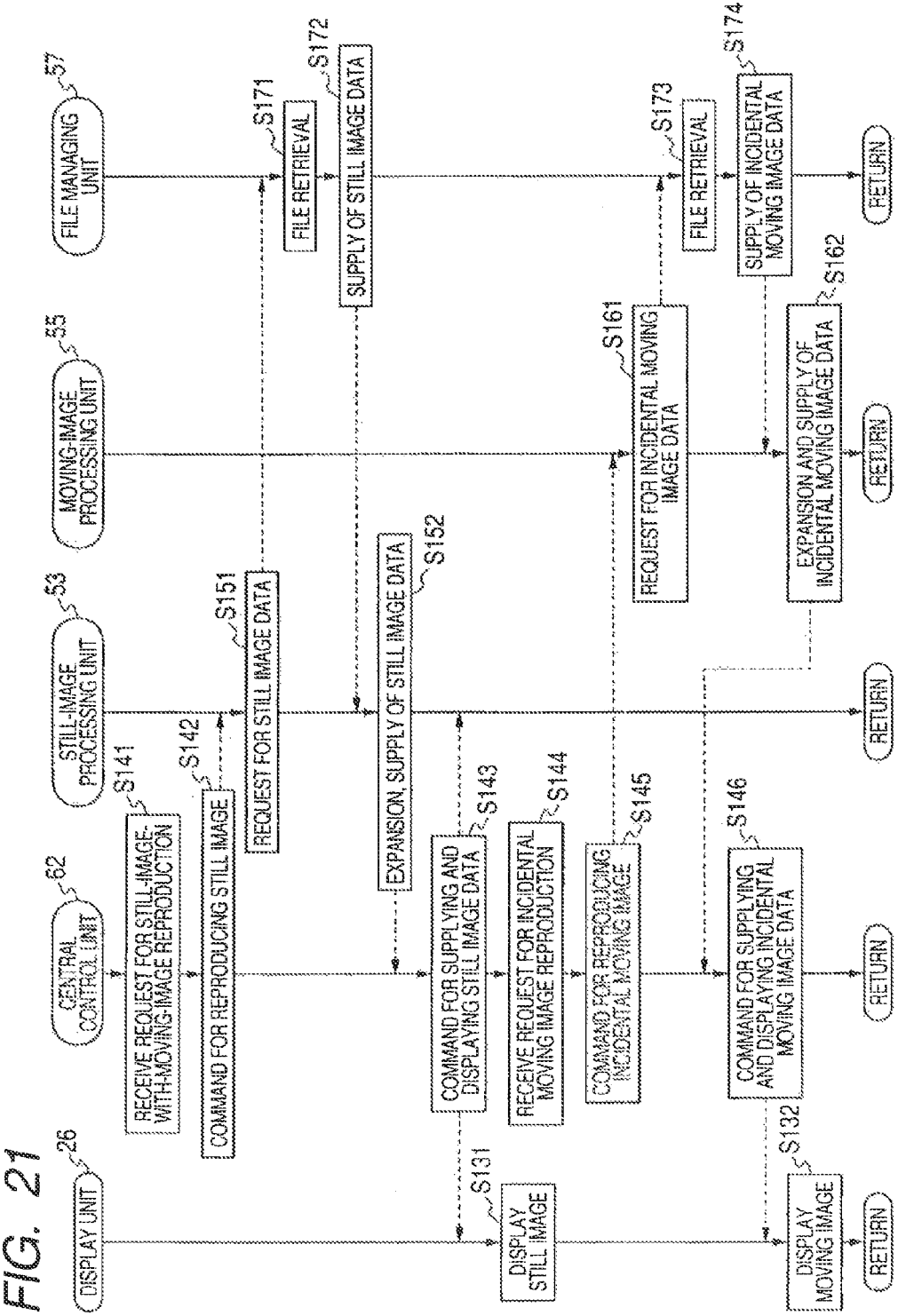
FIG. 21 is a flowchart for explaining processing for reproducing an image photographed in the still-image-with-moving-image photographing mode.

Operations of the digital camera 1 in reproducing an image photographed in the still-image-with-moving-image photographing mode will be explained with reference to a flowchart in FIG. 21.

For example, when the thumbnail image attached with the icon QHR displayed as described above is selected and reproduction of the thumbnail image is requested, in step S141, the central control unit 62 receives a signal indicating to that effect supplied from the control-signal inputting unit 61. In step S142, the central control unit 62 outputs a still-image reproduction command for a still image photographed in the still-image-with-moving-image photographing mode to the still-image processing unit 53.

In step S151, the still-image processing unit 53 requests the file managing unit 57 to read out a file of the still image photographed in the still-image-with-moving-image photographing mode.

In step S171, the file managing unit 57 retrieves the file of the still image photographed in the still-image-with-moving-image photographing mode (the image data of the still image recorded in step S81 in FIG. 5) from the recording medium 15. In step S172, the file managing unit 57 supplies the file (the image data of the still image) to the still-image processing unit 53.

In step S152, the still-image processing unit 53 applies the JPEG expansion processing to the image data of the still image supplied from the file managing unit 57 and supplies image data obtained as a result of the JPEG expansion processing to the central control unit 62.

In step S143, the central control unit 62 supplies the expanded image data of the still image, which is supplied from the still-image processing unit 53, to the display unit 26 and instructs the display unit 26 to display the still image. As a result, in step S131, the selected still image photographed in the still-image-with-moving-image photographing mode is displayed on the display unit 26.

Figure 22:
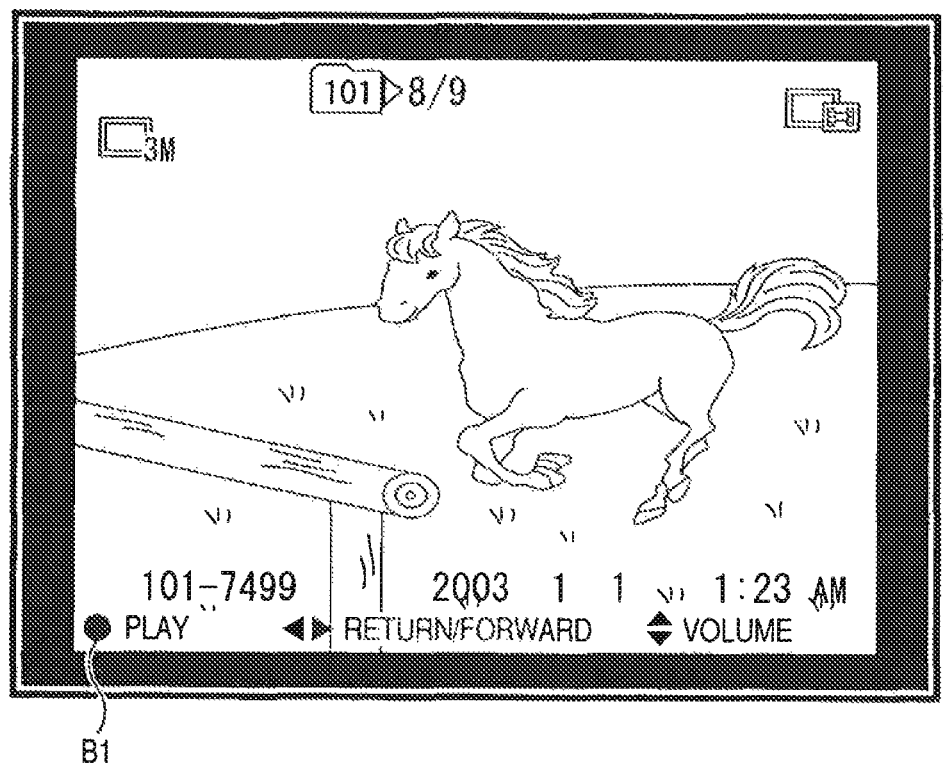
FIG. 22 is a diagram showing an example of an image displayed when an image photographed in the still-image-with-moving-image photographing mode is reproduced.

In FIG. 22, an example of display of the still image photographed in the still-image-with-moving-image photographing mode displayed on the display unit 26 at this point is shown. This still image is a high-definition image having the number of pixels same as that of the still image photographed in the normal still-image photographing mode.

In the case of this example, a button B1 operated in reproducing an incidental moving image is displayed during the display of this still image.

After the still image photographed in the still-image-with-moving-image photographing mode is displayed on the display unit 26 as shown in FIG. 22; reproduction of a moving image (an incidental moving image) photographed in the still-image-with-moving-image photographing mode is requested (e.g., the button B1 in FIG. 22 is operated). In step S144, the central control unit 62 receives, from the control-signal inputting unit 61, a signal indicating that the request is received. In step S145, the central control unit 62 outputs an incidental-moving-image reproduction command to the moving-image processing unit 55.

In step S161, the moving-image processing unit 55 requests the file managing unit 57 to read out a file of the incidental moving image.

In step S173, the file managing unit 57 retrieves a file having a file name same as that of the file of the still image retrieved in step S171 and attached with an extension of a moving image (the incidental moving image recorded in step S83 in FIG. 5) from the recording medium 15. In step S1.74, the file managing unit 57 supplies the file to the moving-image processing unit 55.

In step S162, the moving-image processing unit 55 applies the MPEG expansion processing to image data and sound data of the file supplied from the file managing unit 57 and supplies image data and sound data obtained as a result of the MPEG expansion processing to the central control unit 62.

In step S146, the central control unit 62 supplies the image data of the moving image expanded, which is supplied from the moving-image processing unit 55, to the display unit 26 and causes the display unit 26 to display the moving image. The central control unit 62 outputs sound data via the speaker 34. As a result, in step S132, the incidental moving image of the still image with moving image is reproduced and displayed on the display unit 26.

Figure 23:
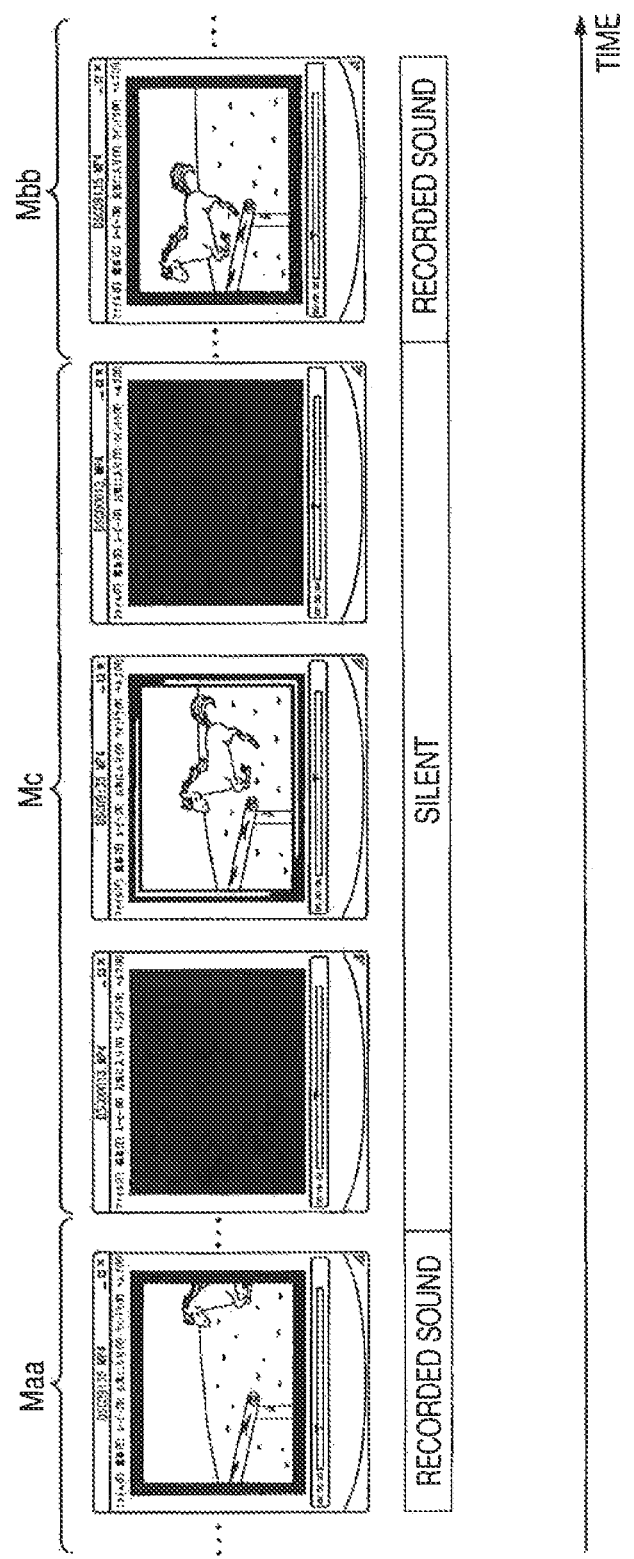
FIG. 23 is a diagram showing another example of an image displayed when an image photographed in the still-image-with-moving-image photographing mode is reproduced.

For example, when an incidental moving image is generated as shown in E in FIG. 9, as shown in FIG. 23, the pre-moving image Maa (a scene before the shutter switch 27 is operated), the still-image corresponding moving image Mc (a dummy frame, a moving image generated from a still image photographed when the shutter switch 27 is operated, and a dummy frame), and the post-moving image Mbb (a scene after the shutter switch 27 is operated) are displayed in order.

$

As sound, during the display of the pre-moving image Maa and the post-moving image Mbb, sound corresponding to the recorded moving image thereof (steps S72 and S74 in FIG. 5) is outputted and, during the display of the still-image corresponding moving image Mc, no sound is outputted.

Figure 24:
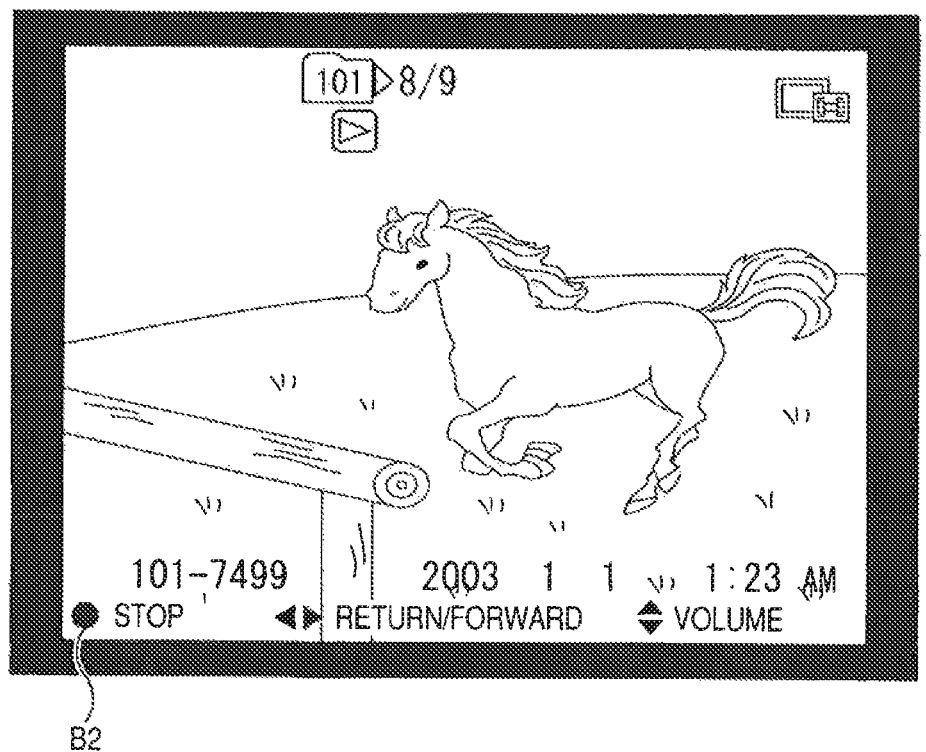
FIG. 24 is a diagram showing an example of an image displayed when an image photographed in the still-image-with-moving-image photographing mode is reproduced.

In the case of this example, while an incidental moving image of a still image with moving image is displayed, as shown in FIG. 24, it is also possible to display a button B2 operated in stopping reproduction of the moving image. When the reproduction of the incidental moving image ends, the processing returns to the still image display.

The image photographed in the still-image-with-moving-image photographing mode is reproduced as described above.

In the above description, at the time of recording, an incidental moving image is generated from the pre-moving image Maa, the still-image corresponding moving image Mc, and the post-moving image Mbb and recorded. At the time of reproduction, the incidental moving image is reproduced according to the normal moving image processing.

However, depending on performance of the reproduction processing, it is possible to, without generating the still-image corresponding moving image Mc and the incidental moving image at the time of recording, record the pre-moving image Maa and the post-moving image Mbb and the still image S separately and, at the time of reproduction, generate the still-image corresponding moving image Mc and reproduce the pre-moving image Maa, the still-image corresponding moving image Mc, and the post-moving image Mbb in this order.

In this case, it is possible to record the pre-moving image Maa and the post-moving image Mbb and the still image S in an identical directory under file names with first four characters different for each of the images as described below. A reproduction side identifies, from the first four characters, the pre-moving image Maa, the post-moving image Mbb, and the still image S and, from a character string (a number sequence) (00001) after that, grasps that these images are related images.

File name of the pre-moving image Maa: PRE00001.MP4
File name of the post-moving image Mbb: PST00001.MP4
File name of the still image S: DSC00001.JPG It is also possible to record the images in an identical directory with the same file name and different extensions as described below. In this case, the reproduction side grasps a relation according to a file name and identifies a type of an image according to an extension.

File name of the pre-moving image Maa: DSC00001.PRE
File name of the post-moving image Mbb: DSC00001.PST
File name of the still image S: DSC00001.JPG It is also possible to further record the still-image corresponding moving image Mc and, at the time of reproduction, directly reproduce the still-image corresponding moving image Mc or generate the still-image corresponding moving image Mc and then reproduce the still-image corresponding moving image Mc. In this case, when the first four characters of the file names are changed, the still-image corresponding moving image Mc is recorded as, for example, a file of DSC00001.MP4 (although the file name is the same as the file name DSC00001.JPG of the still image S, it is possible to identify the file name because identifiers are different). When the extension is changed, the still-image corresponding moving image Mc is recorded as a file of DSC00001.PIC.

When the pre-moving image Maa, the still image S, and the post-moving image Mbb are recorded in different files in this way, it is possible to easily delete, for example, only the pre-moving image Maa or only the post-moving image Mbb. When there is no still-image corresponding moving image Mc, it is possible to reduce an overall file size and, moreover, reproduce a still image having a high image quality.

When an incidental moving image is generated and stored, it is possible to perform reproduction of the incidental moving image according to the general reproduction processing. Thus, it is possible to execute the reproduction using a general-purpose application. In other words, it is unnecessary to prepare a special application for reproduction on the reproduction side.

The invention and a moving image treated are not limited to a predetermined format. It is possible to use MPEG2 and MPEG4-AVC other than MPEG4.

In the above description, it is possible to set any one of "only before photographing of a still image", "only after photographing of a still image", and "before and after photographing of a still image" on a menu screen or the like.

In the above description, the digital camera is explained as an example. However, the invention is not limited to the digital camera. It is possible to apply the invention to apparatuses having a recording function and a reproduction function including a cellular phone and a PDA (Personal Digital Assistant).

Figure 25:
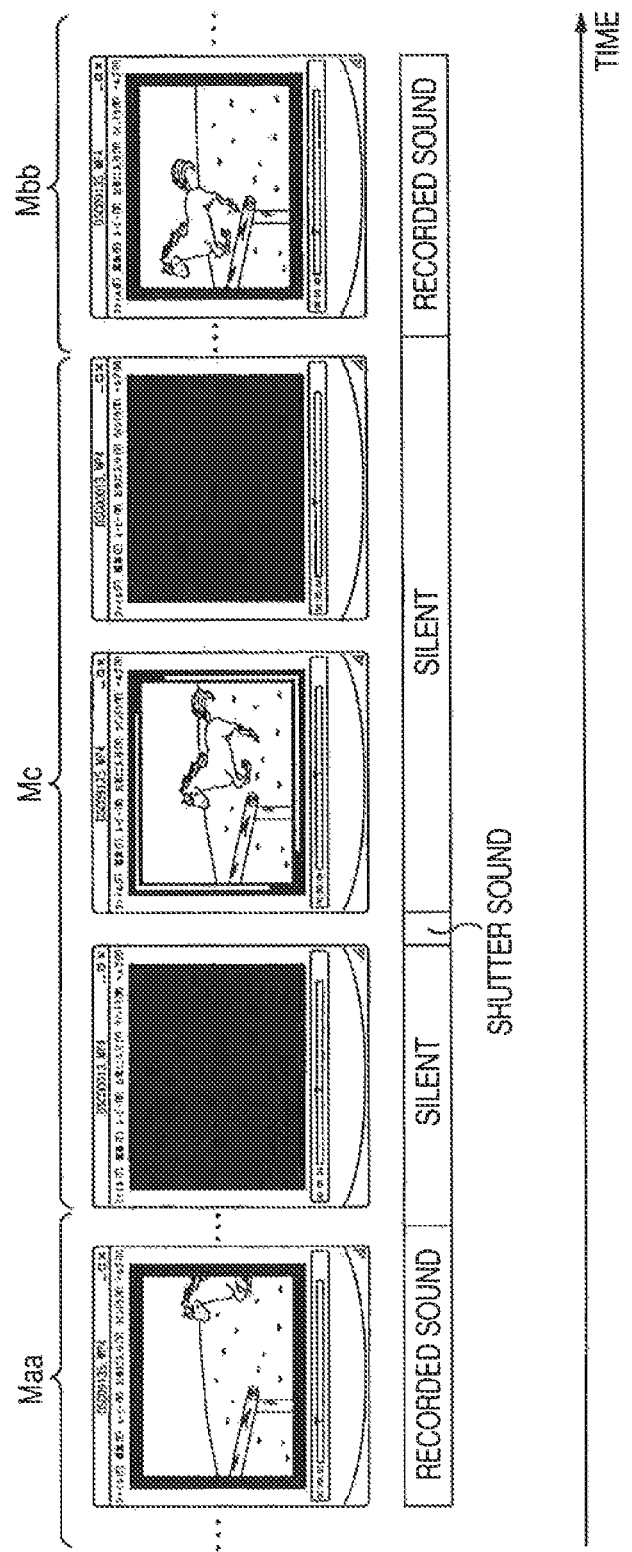
FIG. 25 is a diagram showing another example of an image displayed when an image photographed in the still-image-with-moving-image photographing mode is reproduced.
Figure 26:
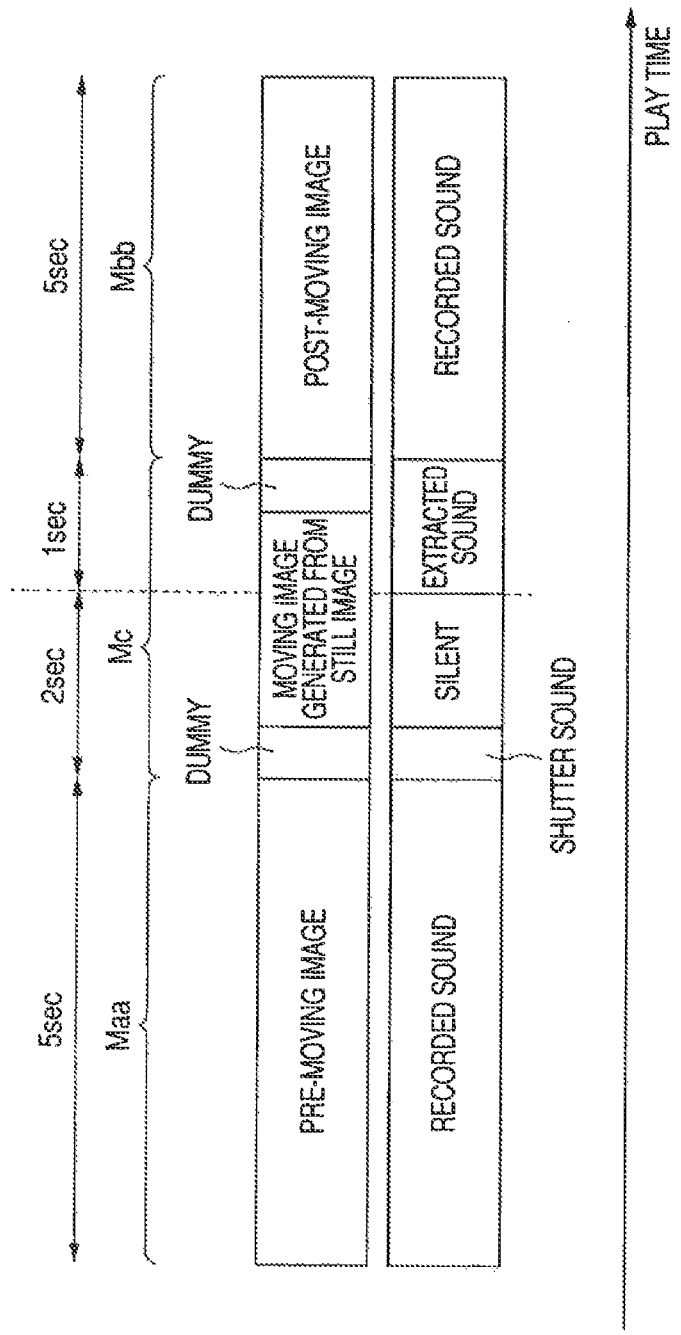
FIG. 26 is a diagram showing still another example of an image displayed when an image photographed in the still-image-with-moving-image photographing mode is reproduced.

In the example in FIG. 23, during the display of the pre-moving image Maa and the post-moving image Mbb, sound corresponding to the recorded moving image thereof is outputted and, during the display of the still-image corresponding moving image Mc, no sound is outputted. However, as shown in FIG. 25, it is also possible to output shutter sound at predetermined timing when the still-image corresponding moving image Mc is displayed in order to indicate that a still image displayed is a still image imaged when the shutter switch 27 is operated. The shutter sound may be inserted into the still-image corresponding moving image Mc at the time of recording in the same manner as the dummy frames.
$ As shown in FIG. 26, it is also possible to record sound as well at the time of photographing of a still image and output the recorded sound (extracted sound) from predetermined timing during the display of the still-image corresponding moving image Mc (in the example in FIG. 26, from one second before reproduction of the post-moving image Mbb).
$ By outputting the sound in this way, it is possible to improve continuity of the change from the still-image corresponding moving image Mc to the post-moving image Mbb.
$ Recording processing (step S3 in FIG. 3) in outputting sound as shown in FIG. 26 will be explained with reference to a flowchart in FIG. 27.
$ When the shutter switch 27 is operated during moving-image temporary storage, in step S201, the central control unit 62 outputs a command for stopping the moving-image temporary storage to the moving-image processing unit 55 (processing same as step S41 in FIG. 5). In step S231, the moving-image processing unit 55 stops the moving-image temporary storage (stops storage of a moving image and sound) and notifies the central control unit 62 that the moving-image temporary storage is stopped (processing same as step S71 in FIG. 5).

When the moving-image temporary storage is stopped, in step S202, the central control unit 62 outputs a command for setting an operation mode of the camera control unit 52 in the still-image recording mode to the camera control unit 52 (processing same as step S42 in FIG. 5).

In step S211, the camera control unit 52 sets the operation mode in the still-image recording mode and, when the setting is completed, notifies the central control unit 62 to that effect (processing same as step S51 in FIG. 5). When the operation mode is set in the still-image recording mode, the camera control unit 52 performs processing for generating image data (2592×1944 dots) of a still image from image data supplied from the image-data inputting unit 51 and supplies the image data to the still-image processing unit 53 in response to a request.

When completion of the setting of the still-image recording mode is notified from the camera control unit 52, in step S203, the central control unit 62 outputs a moving-image temporary storage command to the moving-image processing unit 55.
$ In step S232, the moving-image processing unit 55 starts sound storage processing and notifies the central control unit 62 to that effect.
$ In this case, the operation mode of the camera control unit 52 is set in the still-image recording mode according to the processing in step S211 and the moving-image processing unit 55 cannot acquire image data from the camera control unit 52. Thus, the moving-image processing unit 55 stores only sound data supplied from the sound inputting unit 71. In other words, sound recording during the still image photographing is started.
$ In step S204, the central control unit 62 outputs a still-image recording command to the still-image processing unit 53 (processing same as step S43 in FIG. 5).

In step S221, the still-image processing unit 53 performs still-image recording processing and supplies image data obtained as a result of the still-image recording processing to the file managing unit 57 (processing same as step S61 in FIG. 5).

When image data is supplied from the still-image processing unit 53, in step S241, the file managing unit 57 records the image data in the recording medium 15 (processing same as step S81 in FIG. 5).

When the image data of the still image is recorded, the processing proceeds to step S242. The file managing unit 57 notifies, via the still-image processing unit 53 and the camera control unit 52, the central control unit 62 that the recording of the image data of the still image is completed (processing same as step S82 in FIG. 5).

When the recording of the image data of the still image is completed, in step S205, the central control unit 62 outputs a command for stopping the moving-image temporary storage started according to the command in step S203 to the moving-image processing unit 55.
$ In step S233, the moving-image processing unit 55 stops the sound storage started in step S232 and notifies the central control unit 62 that the sound storage is stopped.
$ When the operation mode of the camera control unit 52 is the still-image recording mode as described above, the moving-image processing unit 55 does not store the moving image and stores only sound even if the moving-image temporary storage command is received. Thus, the sound storage is stopped.
$ In step S206, the central control unit 62 outputs a moving-image-recording-mode setting command to the camera control unit 52 (processing same as step S44 in FIG. 5).

In step S213, the camera control unit 52 sets the operation mode in the moving-image recording mode and, when the setting is completed, notifies the central control unit 62 to that effect (processing same as step S53 in FIG. 5).

When the operation mode of the camera control unit 52 is set in the moving-image recording mode, in step S207, the central control unit 62 outputs a command for recording a moving image photographed in the still-image-with-moving-image photographing mode to the moving-image processing unit 55 (processing same as step S45 in FIG. 5).

When the moving-image processing unit 55 receives this command, in step S234, the moving-image processing unit 55 extracts a moving image serving as the pre-moving image Maa and sound corresponding thereto (processing same as step S72 in FIG. 5).

In step S235, the moving-image processing unit 55 generates the still-image corresponding moving image Mc. At this point, the moving-image processing unit 55 extracts predetermined sound data (in the case of the example in FIG. 26, sound data from one second before reproduction of the post-moving image Mbb) from the sound data stored during the still image recording (the sound data stored from the start of the processing in step S232 until the stop of the processing in step S233).

In step S236, the moving-image processing unit 55 extracts a moving image serving as the post-moving image Mbb and sound corresponding thereto (processing same as step S74 in FIG. 5).

In step S237, the moving-image processing unit 55 generates one moving image in which the pre-moving image Maa, the still-image corresponding moving image Mc generated in step S73, and the post-moving image Mbb generated in step S74 are arranged in a time series order, multiplexes sound data corresponding to the pre-moving image Maa and the post-moving image Mbb and the sound data extracted in step S235 to generate an incidental moving image, and supplies the incidental moving image to the file managing unit 57.

When the incidental moving image is supplied from the moving-image processing unit 55, in step S243, the file managing unit 57 records the incidental moving image in the recording medium 15 (processing same as step S83 in FIG. 5).

When the recording of the incidental moving image is completed, the file managing unit 57 notifies the central control unit 62 to that effect via the moving-image processing unit 55 and the camera control unit 52 (processing same as step S84 in FIG. 5).
$ When the series of processing is executed by software, a program forming the software is installed, from a network or a recording medium, in a computer built in dedicated hardware or, for example, a general-purpose personal computer capable of executing various functions by installing various program therein.
$ The recording medium 15 is not only formed by a package medium such as a magnetic disk (including a floppy disk), an optical disk (including a CD-ROM (Compact Disk-Read Only Memory) and a DVD (Digital Versatile Disk)), and a magneto-optical disk (including an MD (Mini-Disk) (trademark)), or a semiconductor memory having the program stored therein, which is distributed separately from the apparatus body in order to supply the program to the user, but also formed by the ROM 12, a hard disk, or the like having the program stored therein, which is supplied to the user while being built in the apparatus body in advance.
$ In this specification, steps describing a program recorded in a recording medium include not only processing performed in time series according to the order described but also processing not always performed in time series but executed in parallel or individually.
$ Embodiments of the invention are not limited to the embodiments described above. Various modifications of the embodiments are possible without departing from the spirit of the invention.

The invention claimed is:

1. A recording apparatus characterized by comprising:
   a setting unit configured to set a still-image-with-moving-image photographing mode;
   a still-image photographing unit configured to photograph a still image in response to a still-image photographing request while the still-image-with-moving-image photographing mode is set;
   a moving-image photographing unit configured to photograph a moving image while the still-image-with-moving-image photographing mode is set;
   a moving-image storage unit, which continuously buffers the moving image when the still-image-with-moving-image photographing mode is set, wherein when the moving-image storage unit is full, image data of an old frame of the moving image is deleted from the move-image storage unit and image data of a new frame is stored in the moving-image storage unit;
   a generating unit configured to generate an output moving image on the basis of a still image obtained as a result of the photographing by the still-image photographing unit and a moving image that has been obtained as a result of the photographing by the moving-image photographing unit and retrieved from the moving-image storage unit, wherein at least one frame that is visually distinguishable from both the still image and the moving image is provided on at least one side of the still image between the still image and the moving image to generate the output moving image; and recording unit configured to record the still image obtained as a result of the photographing by the still-image photographing unit and the output moving image generated by the generating unit.

2. The recording apparatus according to claim 1, characterized in that the generating unit generates the output moving image on the basis of a first moving image obtained by converting the still image obtained as a result of the photographing by the still-image photographing unit into a moving image, a second moving image photographed by the moving-image photographing unit before the photographing of the still image by the still-image photographing unit; and a third moving image photographed by the moving-image photographing unit after the photographing of the still image by the still-image photographing unit.

3. The recording apparatus according to claim 1, characterized in that the generating unit generates the output moving image on the basis of a first moving image obtained by converting the still image obtained as a result of the photographing by the still-image photographing unit into a moving image and a second moving image photographed by the moving-image photographing unit before the photographing of the still image by the still-image photographing unit.

4. The recording apparatus according to claim 1, characterized in that the generating unit generates the output moving image on the basis of a first moving image obtained by converting the still image obtained as a result of the photographing by the still-image photographing unit into a moving image and a third moving image photographed by the moving-image photographing unit after the photographing of the still image by the still-image photographing unit.

5. The recording apparatus according to claim 1, characterized in that the moving-image photographing unit starts photographing of a moving image when the still-image-with-moving-image photographing mode is set.

6. The recording apparatus according to claim 1, characterized in that the moving-image photographing unit starts photographing of a moving image when a power supply of the recording apparatus is turned on.

7. The recording apparatus according to claim 1, characterized in that the moving-image photographing unit starts photographing of a moving image when a recording medium is inserted.

8. The recording apparatus according to claim 2, characterized in that the generating unit adds an effect to the first moving image obtained by converting the still image obtained as a result of the photographing by the still-image photographing unit.

9. The recording apparatus according to claim 8, characterized in that the generating unit provides a dummy frame before or after or before and after a frame of the first moving image obtained by converting the still image obtained as a result of the photographing by the still-image photographing unit.

10. The recording apparatus according to claim 8, characterized in that the generating unit inserts shutter sound, which is outputted according to timing when the first moving image obtained by converting the still image obtained as a result of the photographing by the still-image photographing unit is reproduced, into the first moving image.

11. The recording apparatus according to claim 1, characterized by further comprising:

first sound acquiring unit for acquiring sound data of sound during the photographing of a moving image by the moving image photographing unit; and second sound unit for acquiring sound data of sound during the photographing of a still image by the still-image photographing unit, and in that the generating unit generates the output moving image by multiplexing sound acquired by the first sound acquiring unit, which corresponds to the moving image used for generating the output moving image, and all or a part of the sound data acquired by the second sound acquiring unit, which corresponds to the still image used for generating the output moving image.

12. The recording apparatus according to claim 9, characterized in that the generating unit provides, when a frame rate of a moving image on a reproduction side is fixed, dummy frames in a number enough for maintaining the frame rate before or after or before and after a frame of the first moving image obtained by converting the still image obtained as a result of the photographing by the still-image photographing unit.

13. The recording apparatus according to claim 9, characterized in that the generating unit provides, when a frame rate of a moving image on a reproduction side is variable, an arbitrary number of dummy frames before or after or before and after a frame of the first moving image obtained by converting the still image obtained as a result of the photographing by the still-image photographing unit.

14. The recording apparatus according to claim 1, characterized in that the generating unit extracts a predetermined moving image out of a moving image photographed by the moving-image photographing unit and generates the output moving image from the moving image extracted and a moving image obtained by converting the still image obtained as a result of the photographing by the still-image photographing unit.

15. The recording apparatus according to claim 14, characterized in that the generating unit extracts, when the moving image photographed by the moving-image photographing unit is formed by using inter-frame compression, a moving image headed by a frame for which only intra-frame compression is used or a frame forming a basis of the inter-frame compression.

16. The recording apparatus according to claim 1, characterized in that the recording unit records the still image obtained as a result of the photographing by the still-image photographing unit and the output moving image generated by the generating unit under the same file name.

17. A recording apparatus according to claim 1, characterized by further comprising display control means for displaying a UI image corresponding to a recorded image during the recording by the recording unit.

18. An image processing apparatus comprising circuitry configured to:

continuously buffer a number of frames of a moving image when a still-image-with-moving image photographing mode is set;

buffer a new frame so that an old frame is deleted;

generate a still image in response to a command for starting still image recording;

generate a frame of a moving image corresponding to the timing of the generation of the still image; and generate an output moving image on the basis of the still image and the moving image, wherein at least one frame that is visually distinguishable from both the still image and the moving image is provided on at least one side of the still image between the still image and the moving image to generate the output moving image.

19. The image processing apparatus of claim 18, wherein:
a size of the still image is larger than a size of the moving image.

20. The image processing apparatus of claim 18, the circuitry further configured to:
generate the still image when a shutter is depressed.

21. The image processing apparatus according to claim 20, wherein:
at the time of the depressing of the shutter, the moving image does not exist.

22. An image processing method comprising:
continuously buffering a number of frames of a moving image when a still-image-with-moving image photographing mode is set;
buffering a new frame so that an old frame is deleted;
generating a still image in response to a command for starting still image recording;
generating a frame of a moving image corresponding to the timing of the generation of the still image; and
generating an output moving image on the basis of the still image and the moving image, wherein at least one frame that is visually distinguishable from both the still image and the moving image is provided on at least one side of the still image between the still image and the moving image to generate the output moving image.

23. The image processing method of claim 22, wherein:
a size of the still image is larger than a size of the moving image.

24. The image processing method of claim 22, further comprising:
generating the still image when a shutter is depressed.

25. The image processing apparatus according to claim 24, wherein:
at the time of the depressing of the shutter, the moving image does not exist.

26. A non-transitory computer readable medium storing a program, wherein the program includes instructions for an image processing apparatus to perform a method comprising:
continuously buffer a number of frames of a moving image when a still-image-with-moving image photographing is set;
buffer a new frame so that an old frame is deleted;
generate a still image in response to a command for starting still image recording;
generate a frame of a moving image corresponding to the timing of the generation of the still image; and
generate an output moving image on the basis of the still image and the moving image, wherein at least one frame that is visually distinguishable from both the still image and the moving image is provided on at least one side of the still image between the still image and the moving image to generate the output moving image.

27. The non-transitory computer readable medium of claim 26, wherein:
a size of the still image is larger than a size of the moving image.

28. The non-transitory computer readable medium of claim 26, the method further comprising:
generating the still image when a shutter is depressed.

29. The non-transitory computer readable medium of claim 28, the method further comprising:
at the time of the depressing of the shutter, the moving image does not exist.

* * * * *